United States Patent [19]

Tadamura et al.

[11] Patent Number: 5,157,662
[45] Date of Patent: Oct. 20, 1992

[54] DATA COMMUNICATION APPARATUS HAVING COMMUNICATION-MODE CHANGEOVER FUNCTION AND METHOD OF DATA COMMUNICATION BETWEEN DATA COMMUNICATION STATIONS HAVING THE SAME

[75] Inventors: Katsumi Tadamura; Keiichi Nakane, both of Yokohama, Japan

[73] Assignee: Hitachi, Ltd., Tokyo, Japan

[21] Appl. No.: 654,196

[22] Filed: Feb. 12, 1991

[30] Foreign Application Priority Data

Feb. 13, 1990 [JP] Japan ................................ 2-29577

[51] Int. Cl.⁵ ............................................. H04J 3/12
[52] U.S. Cl. .................................. 370/110.1; 370/60.1; 370/68.1
[58] Field of Search ................. 370/110.1, 60.1, 68.1

[56] References Cited

U.S. PATENT DOCUMENTS 4,596,021 6/1986 Carter et al. ............... 370/110.1 X
4,996,685 2/1991 Farese et al. ............... 370/110.1 X Primary Examiner—Douglas W. Olms
Assistant Examiner—Russell W. Blum
Attorney, Agent, or Firm—Antonelli, Terry, Stout & Kraus

[57] ABSTRACT

In an ISDN network, data communications can be performed in two communication modes corresponding to line and packet switchings in the same network. The line switching is effective in transmitting mass data to a receiving station and receiving the same therefrom at high speed, and accounting is made to a period of time required for communication in a public network. On the other hand, the packet switching is effective in transmitting low-speed data or small amounts of data produced in a discrete manner, and accounting is made to the amount of transmitted data in the public network.

With a valve toward making efficient use of the two communication modes, the present invention relates to a data communication apparatus of the type wherein the two communication modes are changed as needed so as to perform data communications, and to a data communication system suitable for use with the data communication apparatus. In other words, a means for performing data communication continuously over two calls is provided so as to change one communication mode to another under data communication based on a user's request.

Thus, when the amount of creation of data varies appreciably under communication, data communication is made based on the optimal communication mode determined according to the amount of creation of the data.

19 Claims, 31 Drawing Sheets

FIG. 5

| NO. 501 | CALL CLASSI-FICATION 502 | NUMBER OF STATION CALLED 503 | TRANSMIT PACKET NUMBER 504 | RECEIVE PACKET NUMBER 505 | ADDRESS FOR TRANSMITTING BUFFER TO BE USED 506 | ADDRESS FOR RECEIVING BUFFER TO BE USED 507 | NUMBER OF CALL CONNECTED 508 | BUSY FLAG 509 | CHANGEOVER FLAG 510 | CHANGEOVER COMPLETE FLAG 511 |
|---|---|---|---|---|---|---|---|---|---|---|
| 1 | | | | | | | | | | |
| 2 | | | | | | | | | | |
| 3 | | | | | | | | | | |
| 4 | | | | | | | | | | |
| ------ | | | | | | | | | | |

TABLE FOR CONTROL OF CALL FOR DATA COMMUNICATION 500

FIG. 6
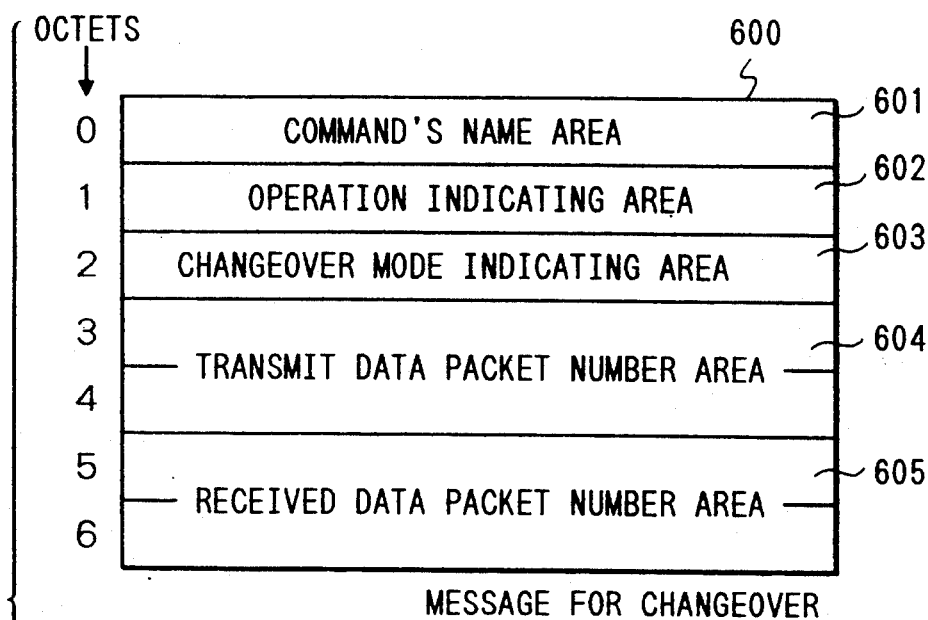
MESSAGE FOR CHANGEOVER
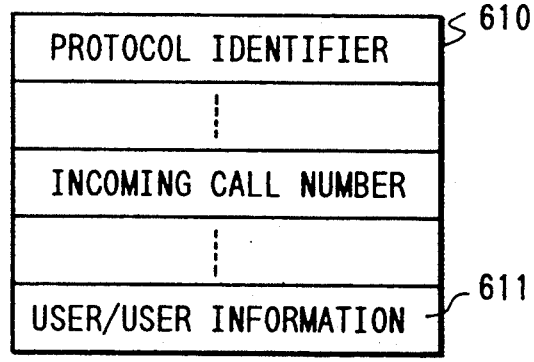
PRIMITIVE FOR CONTROL OF LINE SWITCHING CALL (SETUP)

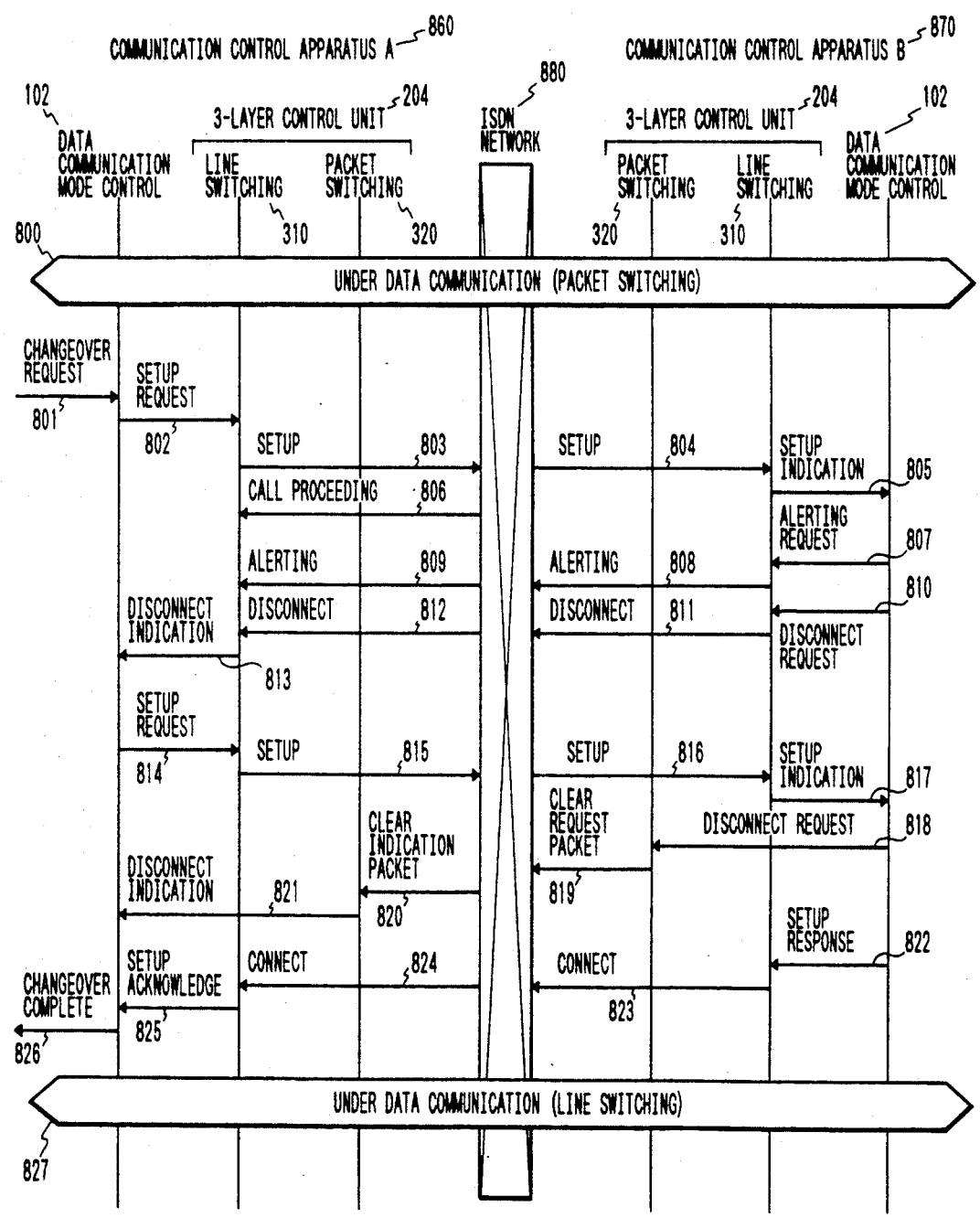

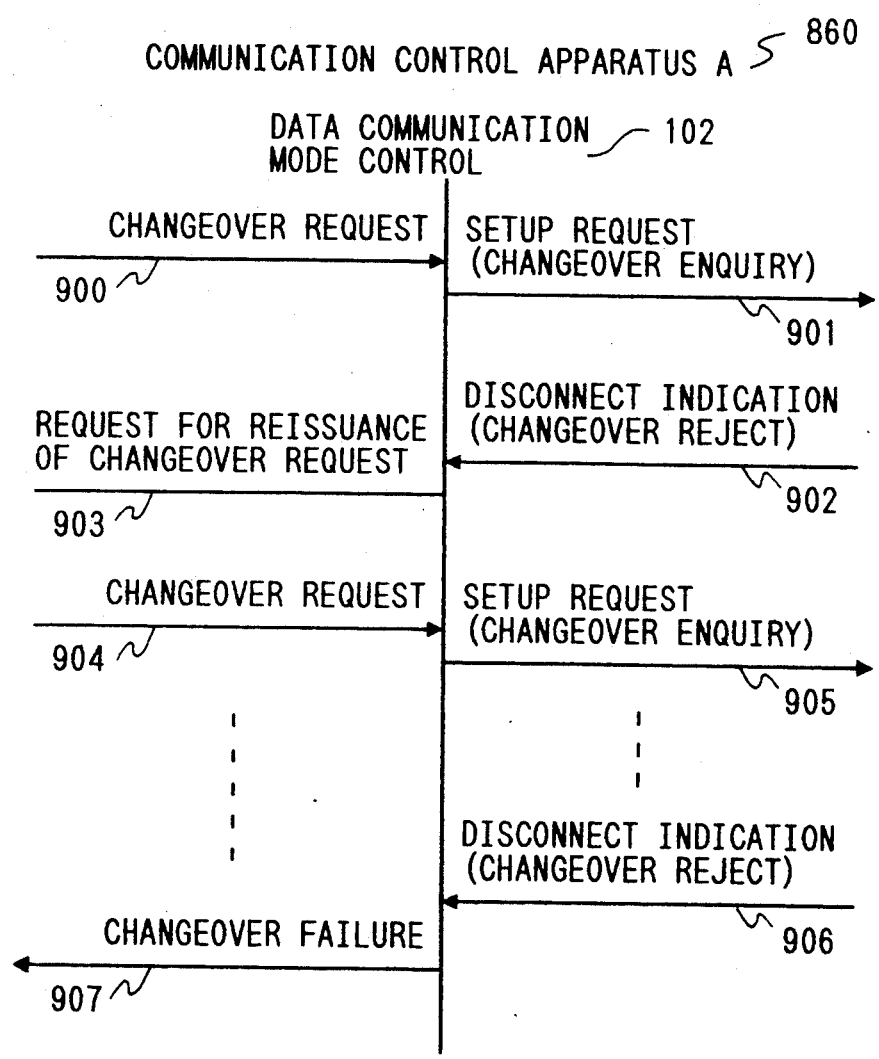

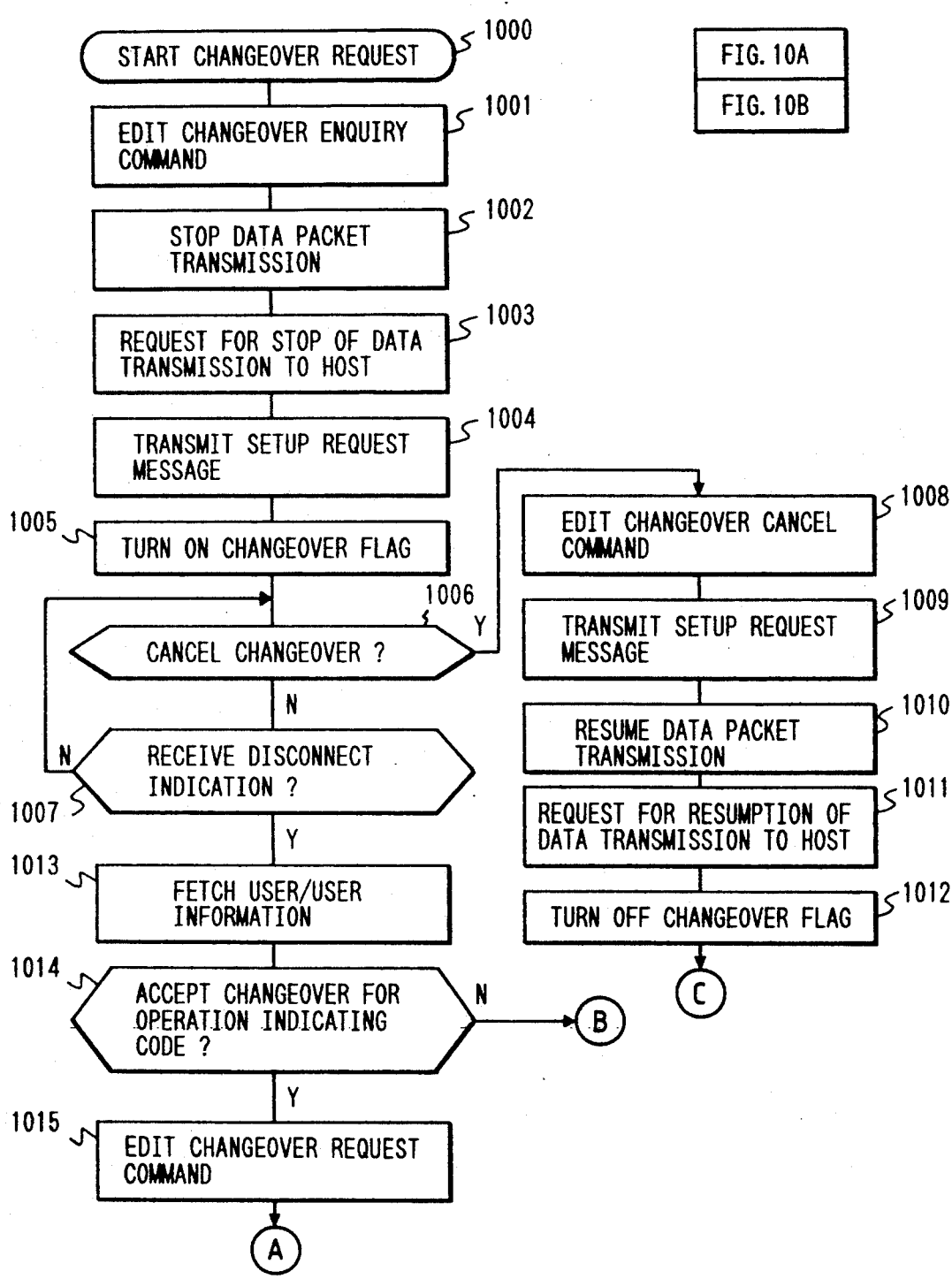

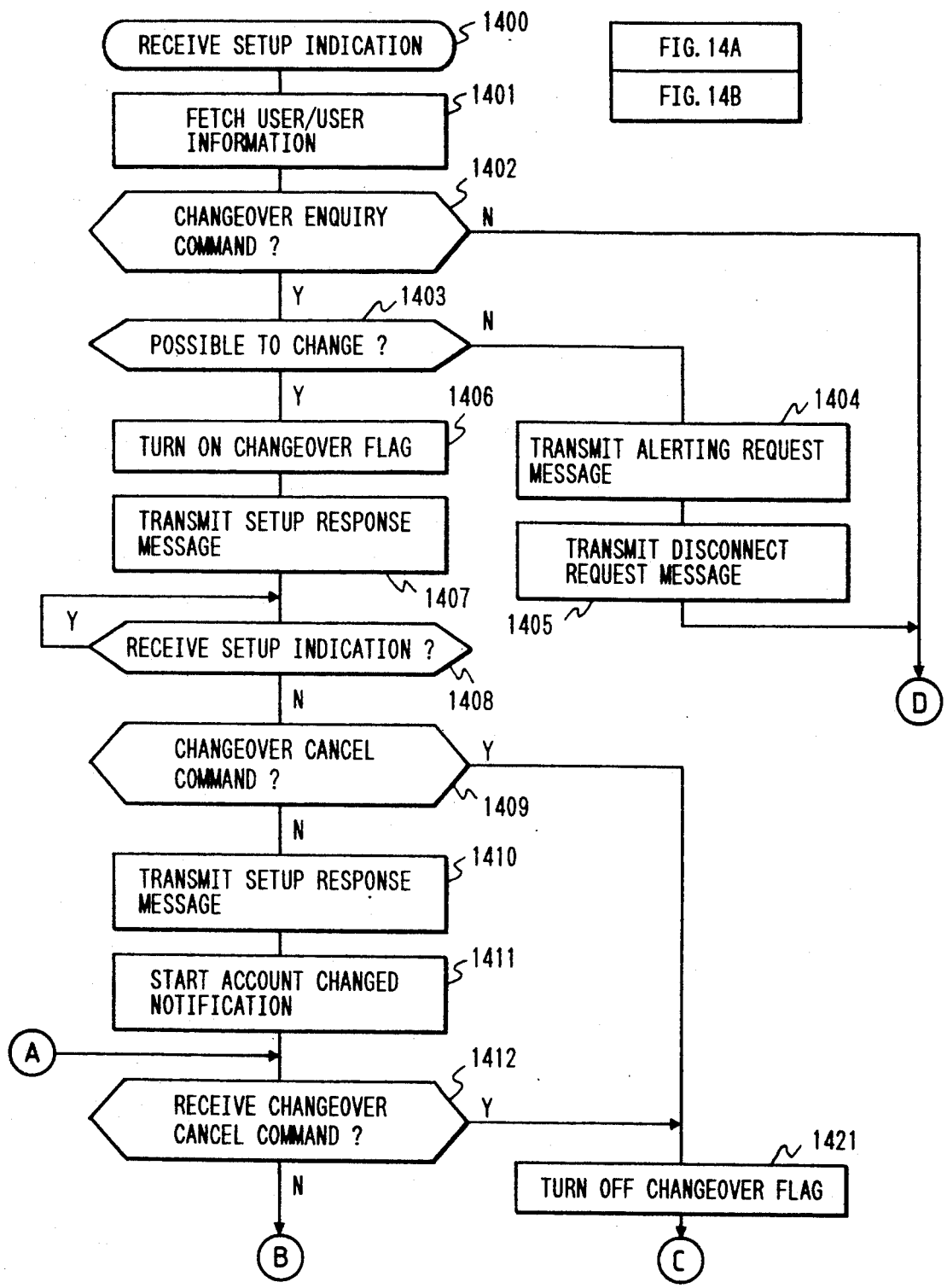

FIG. 15

| CALL NUMBER | ACCOUNTING PERIOD AREA CHANGED | NOTIFY REQUEST POSITIVE/ NEGATIVE AREA | COUNTER |
|---|---|---|---|
| 2 | 1800 | 1780 | 19 |
|  |  |  |  |
|  |  |  |  |
| ⋮ |  |  |  |

1510 — 1520 — 1530 — 1540 — 1500

TABLE FOR CONTROL OF ACCOUNTING PERIOD USED FOR LINE SWITCHING CALL

FIG. 16

| RECEIVING STATION / TRANSMITTING STATION | 1610 | | | |
|---|---|---|---|---|
|  | 03 | -------- | 045 | -------- |
| 1620 | ⋮ | ⋮ |  | ⋮ |
| 045 |  |  | 180 |  |
|  | ⋮ | ⋮ |  |  |

1600

TABLE FOR RETRIEVAL OF ACCOUNTING PERIOD

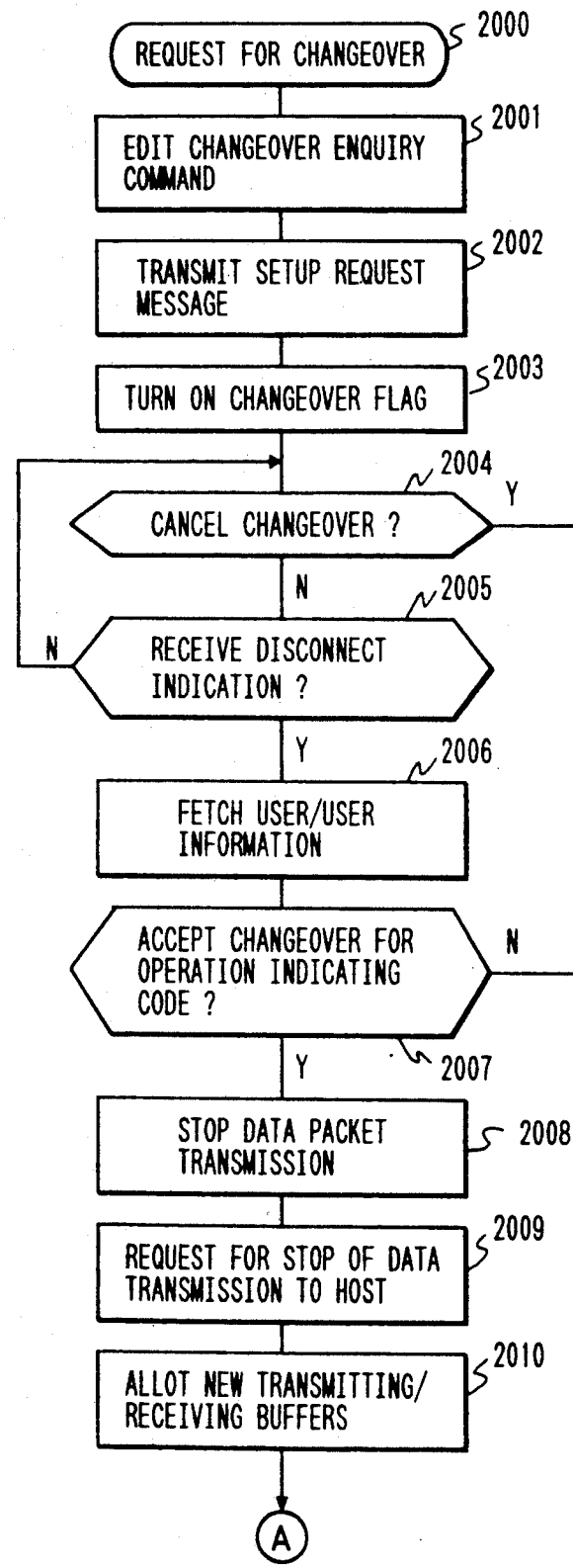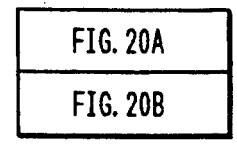

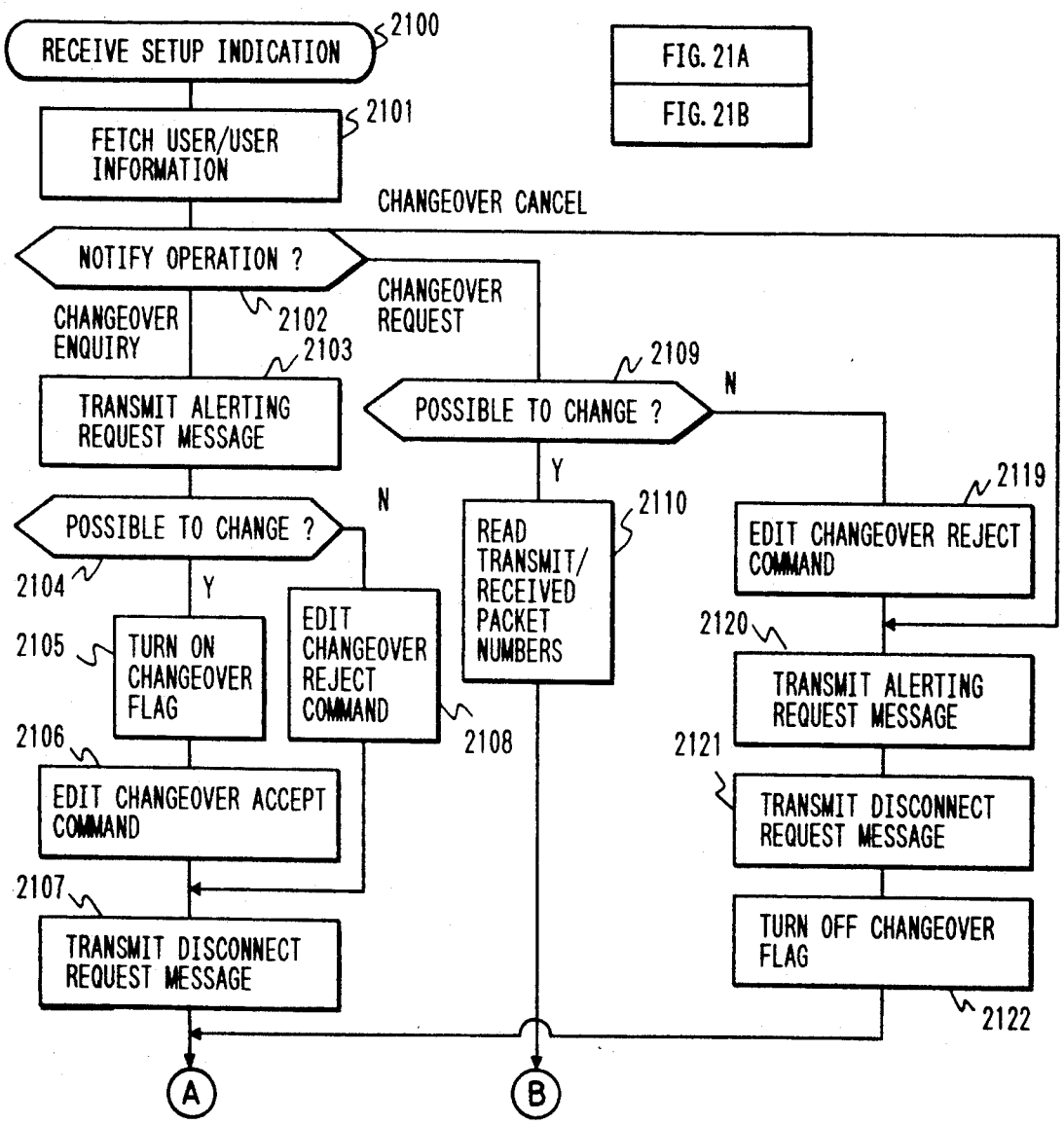

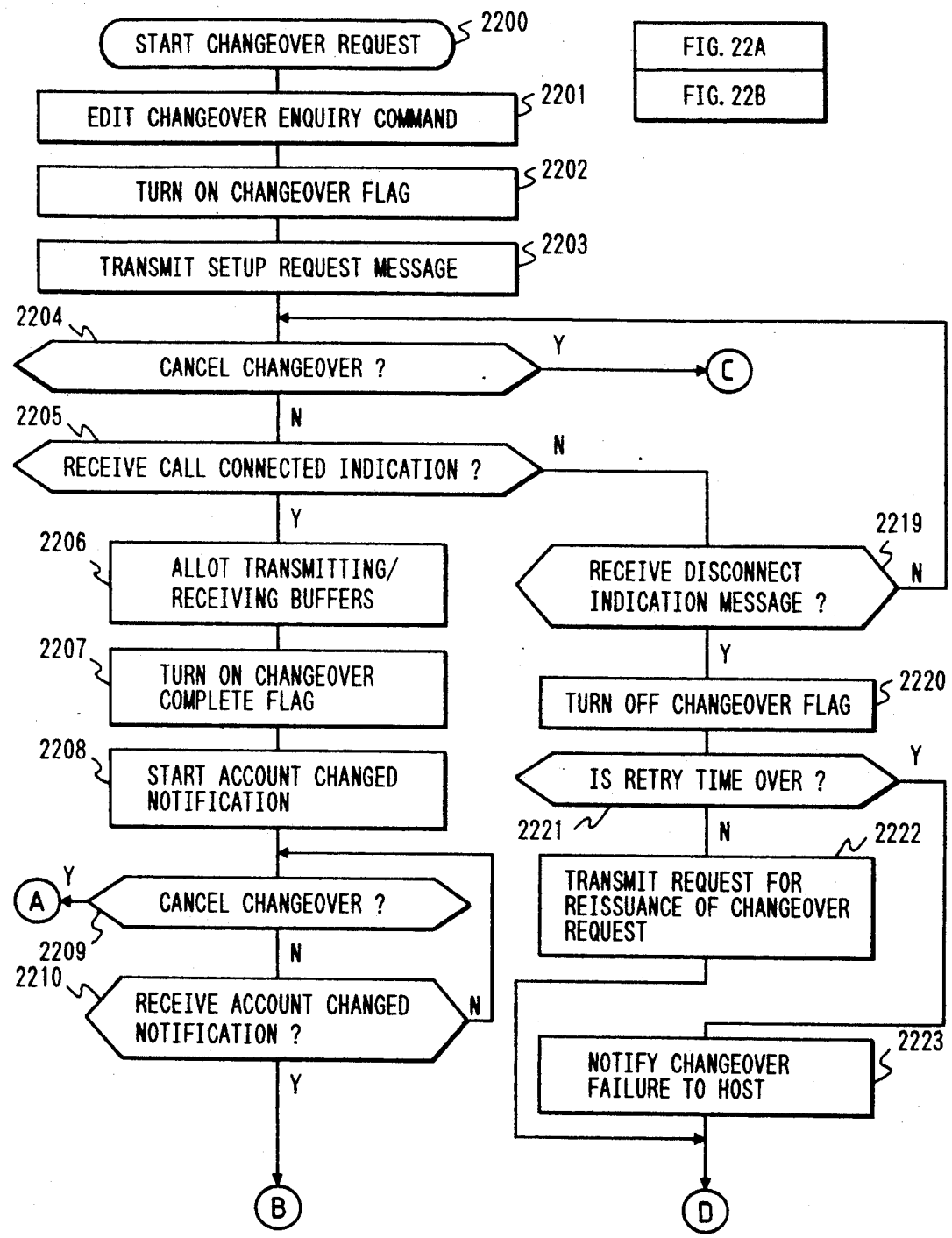

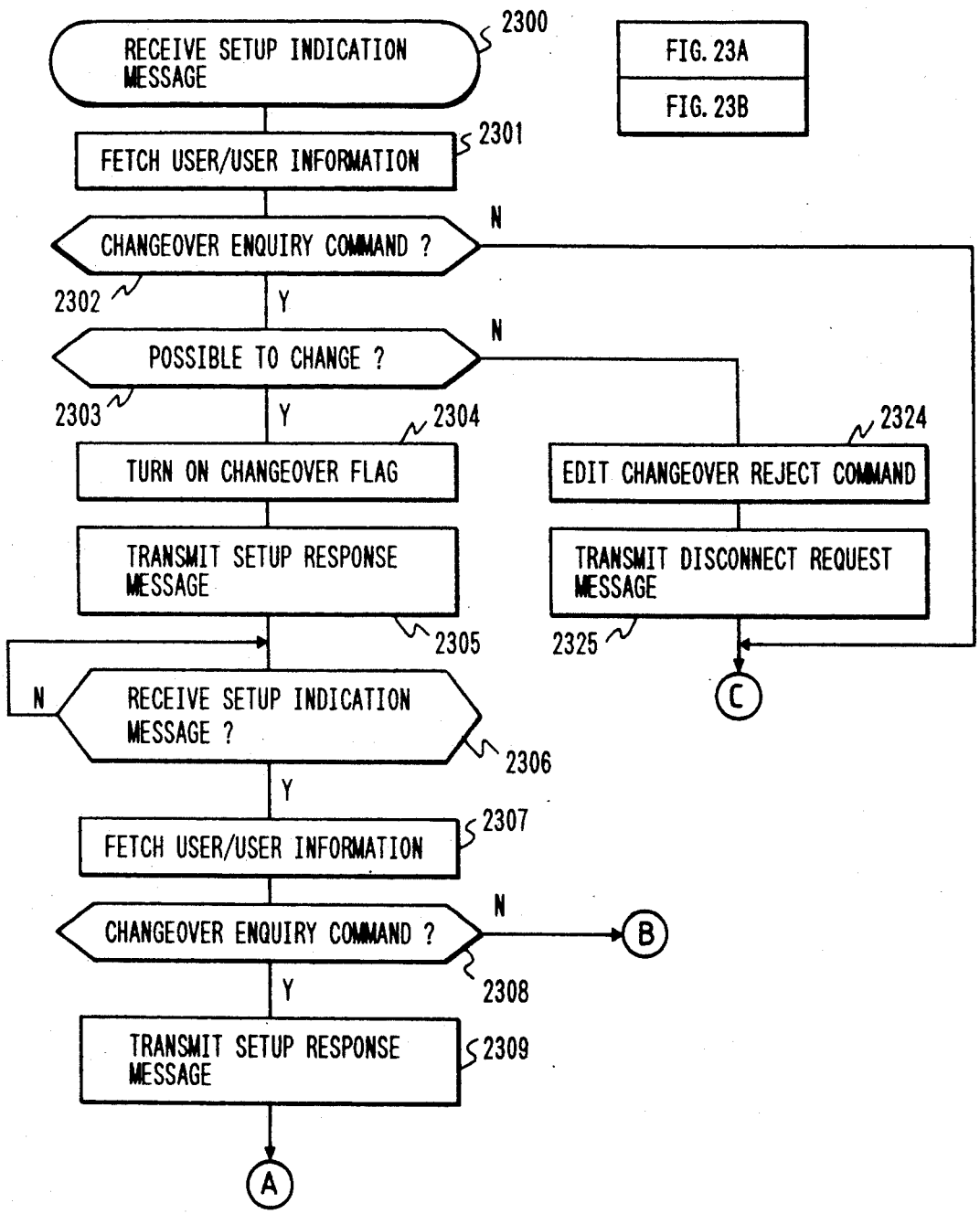

FIG. 24

| 2401 | 2402 | 2403 | 2404 | 2405 | 2406 | 2407 | 2408 |
|---|---|---|---|---|---|---|---|
| CALL NUMBER | COMMUNICATION MODE | BUFFER WRITE POINTER | BUFFER WRITE POINTER PRIOR TO ONE PERIOD | COMMUNICATION MODE PRIOR TO CHANGEOVER | TOTAL AMOUNT OF DATA | INCREMENT/ DECREMENT RELATIVE TO THRESHOLD VALUE | ACCELERATION |
|  |  |  |  |  |  |  |  |

TABLE FOR SUPERVISING DATA COMMUNICATION 2400

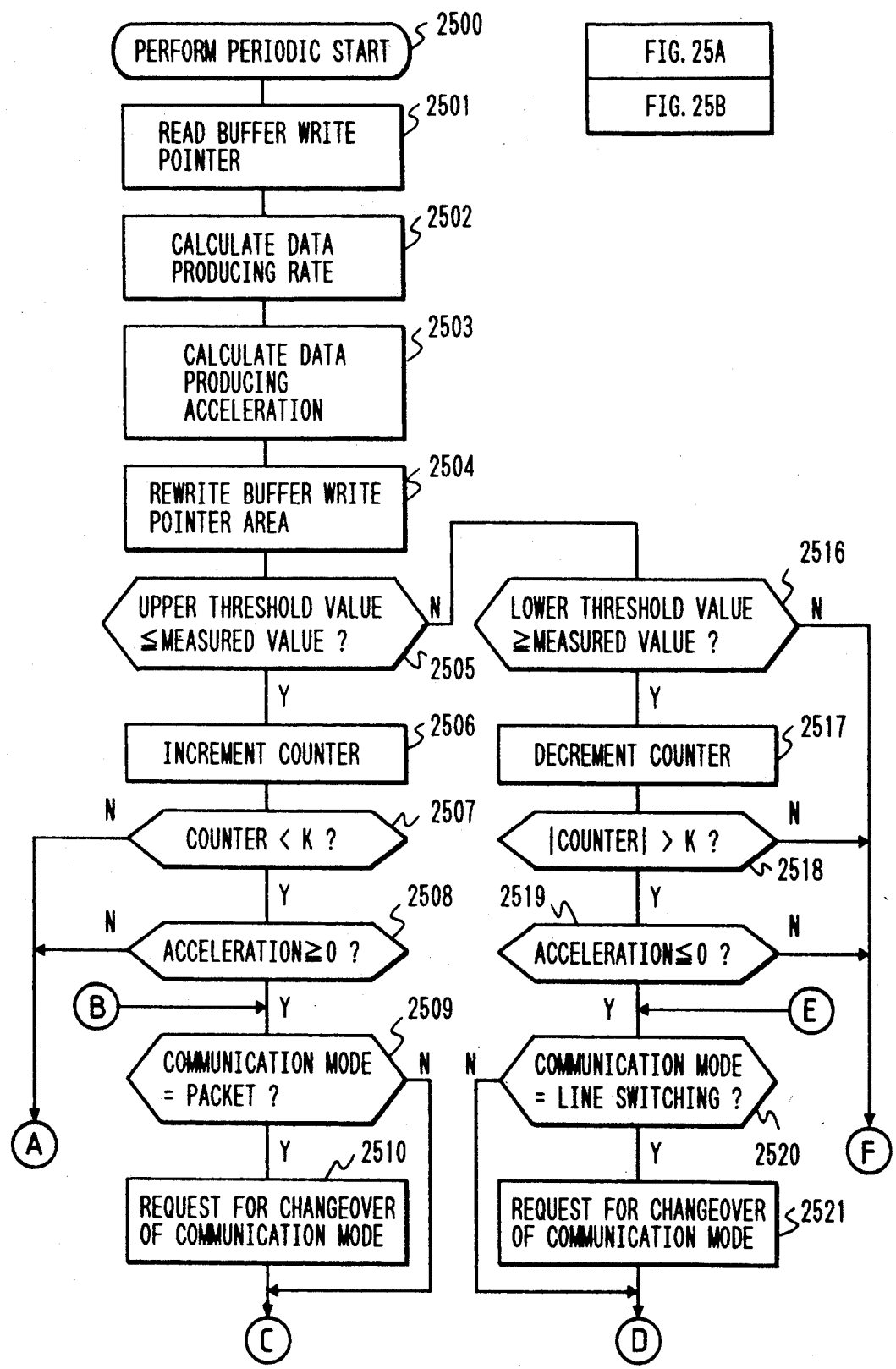

DATA COMMUNICATION APPARATUS HAVING COMMUNICATION-MODE CHANGEOVER FUNCTION AND METHOD OF DATA COMMUNICATION BETWEEN DATA COMMUNICATION STATIONS HAVING THE SAME

BACKGROUND OF THE INVENTION AND RELATED ART

The present invention relates to a data communication apparatus connectable to an ISDN network and capable of performing data communication in a plurality of communication modes such as line switching and packet switching, and to a method of data communication between data communication stations having communication-mode changeover function.

In the ISDN network, data communications can be carried out in two communication modes comprised of line switching and packet switching in the same network. This is one of the communication services which have not been realized in a conventional public communication network.

Data communication using the line switching is an effective means where large amounts of data are transmitted and/or received at high speed. In the public communication network, accounts or charges are made for the time required for data communication. On the other hand, data communication using the packet switching is an effective method in a case where low-speed data communications are made and small amounts of data generated or created in a discrete manner are transmitted and/or received. In this data communication, charges are made for the amount of data transmitted.

When the level or density of generation of data varies between the two stations which perform data communications continuously over a long period of time, the execution of data communication in a communication mode suitable for the density of generation of the data is most effective. It is necessary to change over the communication mode from the line switching to the packet switching or vice versa under data communication in order to realize this.

However, when it is desired to perform a highspeed data communication, there has heretofore been used a digital dedicated line of such a type that a fixed rate charged for data communication is paid for each month. It was therefore unnecessary to take into consideration variations in the density of generation of the data. As disclosed in Japanese Patent Publication Laid-Open No. 62(1987)-290242, this disclosure describes a conventional data communication apparatus of a type wherein the amount of information processed in a central processing unit is supervised, and when its amount exceeds 80% of the information-processing amount, which is defined as the threshold value, the data receiving rate is reduced, whereas when it is below 80%, the data receiving rate is raised, without changing the communication mode from the line switching to the packet switching or vice versa. On the other hand, when it is desired to change the communication rate, this has been realized by performing the data transfer, i.e., data transmission/reception in a escape sequence form between communication terminal apparatus.

Further, Japanese Patent Publication Laid-Open No. 61(1986)-158244 discloses a facsimile apparatus capable of performing data communications in the two communication modes described above. However, the disclosure cannot perform the communication-mode changeover under data communication because the communication-mode changeover is simply performed in hardware form in advance of the data communication.

The above-described prior art has a problem that it is used to change the communication rate according to the amount of the generated data corresponding to the processing rate in the CPU and it does not take into consideration a system of such a type that the accounts or charges are made for the time required for the data communication as in the public communication line, thus the more the communication rate being reduced, the more the amount of accounts or charges increasing. In addition, the prior art also has another problem that all the data are needed to be supervised in the data communication apparatus because the communication rate is varied and the data transmission/reception is performed in the escape sequence form, thus increasing processing overhead time.

OBJECT AND SUMMARY OF THE INVENTION

A first object of the present invention is to make it possible to change over a plurality of communication modes such as line switching and packet switching between data communication apparatus with a view toward reducing the amount of accounts as small as possible without causing generated data to be in waiting upon execution of data communication using an ISDN and raising, as much as practicable, the efficiency in use of information channels inclusive of other communication as well as the data communication.

More specifically, high-speed data can be transmitted during a period in which the density of transmit/receive data is high. In addition, the data communication to be accounted according to the time required for data communication is carried out in the line switching form. On the other hand, the data communication can be performed in the packet switching form during a period in which the density of the transmit/receive data is low and the data communication can be performed even at the data transmission rate based on the packet switching.

A second object of the present invention is to select a most suitable communication mode out of a plurality of communication modes according to variations in the density of generation of data under data communication to thereby automatically perform a communication-mode changeover process.

A third object of the present invention is to perform a communication-mode changeover process without breaking the continuity of the flow of transmit and receive data even upon changeover of the communication mode.

A fourth object of the present invention is to continuously perform data communication based on line switching until the time immediately before the amount of accounts is varied upon changing the communication mode from line switching to packet switching, thereby realizing the high efficiency of data transmission with respect to the amount of accounts.

In order to achieve the above first object, there is provided a data communication apparatus comprising changeover inquiring means for enquiring of a receiving station or a called party subjected to data communication whether or not the changeover of one of data communication modes to another can be performed, and changeover control means activated in such a manner that when a communication-mode changeover enable response is received from the receiving station, the data transmit-receive transfer of from one of two data communication calls to the other thereof is effected between said two data communication calls created between a transmitting station and said receiving station. In addition, there are provided, in a data communication system linked between the data communication apparatus, a changeover inquiring command for making an inquiring as to whether or not the communication mode can be changed from a first data communication apparatus to a second data communication apparatus, a changeover acceptance command delivered from a second data terminal apparatus in response to the changeover inquiring command when the communication-mode changeover is enabled, and a changeover reject command delivered from the second data terminal apparatus when the communication-mode changeover is disabled.

Further, in order to achieve the second object, there is provided a data communication control apparatus comprising density-of-generation-of-data supervising means for supervising the level or density of creation of data under data communication, which is activated in such a manner that a process for changing the present communication mode to another communication mode is initiated where a situation of the density of creation of the data meets a condition for the communication-mode changeover.

Furthermore, in order to achieve the third object of the present invention, the transfer of undelivered data is performed by the changeover control means upon changing one of the two data communication calls corresponding to two communication modes to the other.

Still further, in order to achieve the fourth object of the present invention, there is provided a data communication apparatus comprising means for calculating the date of communication and the time at which the rate of accounts varies according to the difference in distance between the transmitting and receiving stations, and a communication call control means activated in such a manner that data communication is made by means of a data communication call based on the line switching up to the time at which the rate of the accounts varies.

When a data communication terminal received with a request for the data communication-mode changeover from a user under data communication makes an inquiry as to whether or not the communication-mode changeover can be performed, so as to receive a communication-mode changeover enable response from a called party, i.e., a receiving station, the data transmit-receive transfer of from one of two data communication calls to the other thereof is performed between the two data communication calls produced between the transmitting and receiving stations. More specifically, the changeover inquiring command is used to make an inquiring as to whether on not the communication mode can be changed from the first data communication apparatus to the second data communication apparatus, in a data communication system linked between the data communication apparatus. The changeover acceptance command is delivered from the second data terminal apparatus in response to the changeover enquiry command and used to transmit a communication-mode changeover enable response to the first data communication apparatus. The changeover reject command is delivered from the second data terminal apparatus and used to transmit a communication-mode changeover disable response to the first data communication apparatus. The first data communication apparatus performs the communication-mode changeover processing in response to the changeover acceptance command.

Still further, the density-of-generation-of-data supervising means in the data communication apparatus serves to supervise the density of production of data under data communication. The data communication apparatus makes a judgment as to in which kinds of communication modes the data communication should be performed suitably, thereby determining a desired communication mode for performing the data communication.

Still further, the changeover control means is used to control communication-mode changeover timing and the undelivered data upon changeover of the communication mode in order to prevent data from being undelivered.

Still further, the above calculating means calculates the date of communication and the time at which the rate of accounts varies according to the difference in distance between the transmitting and receiving stations. The changeover control means is so activated that the data communication is performed by means of the data communication call based on the line switching up to the time at which the rate of the accounts varies, thereby making it possible to make the best use of the time necessary for data communication, which can be used in the same charge, and to carry out data communication in the minimum charge.

According to the present invention, since the communication-mode changeover can be carried out between the data communication modes without discontinuing the data communication on the basis of the changeover request from the user, it is possible to perform economically-effective data communications corresponding to the amount of the generated data. In addition, the data communication-mode changeover request can automatically be made even though no changeover request is made from the user. Therefore, the communication mode corresponding to the amount of the generated data can be selected even when the user does not supervise the conditions of generation of the data at all times.

In addition, the interconnection of data between a call-before-changeover and a call-after-changeover can be held by means of interconnection of communication buffers to be used, upon changeover of the communication mode. Therefore, the data communication can be performed without breaking the continuity of the data even when the data communication-mode is changed from the line switching to the packet switching or vice versa. Furthermore, upon changing the communication mode from the line switching to the packet switching, the data communication based on the line switching can be carried out up to a straight line from which the rate of accounts made under the line switching increases, thereby making it possible to perform an economically-effective data communication-mode changeover.

The above and other objects, features and advantages of the present invention will become apparent from the following description and the appended claims, taken in conjunction with the accompanying drawings in which a preferred embodiment of the present invention is shown by way of illustrative example.

BRIEF DESCRIPTION OF THE DRAWINGS

FIG. 5 is a diagram showing a table for control of data communication calls;

FIG. 6 is a diagram depicting a format of messages for communication mode changeover;

FIGS. 8, 12 and 19 are diagrams each depicting a message sequence used in said one embodiment of the present invention;

FIG. 9 is a diagram showing the relationship of transmission between a changeover reject and a request for reissuance of changeover request;

FIG. 15 is a diagram showing a table for control of accounting period used for each line switching call;

FIG. 16 is a diagram depicting a table for retrieval of accounting period;

FIG. 24 is a diagram showing the structure of a table for supervising the amount of creation of data based on a data communication call;

DETAILED DESCRIPTION OF THE PREFERRED EMBODIMENTS

Figure 2:
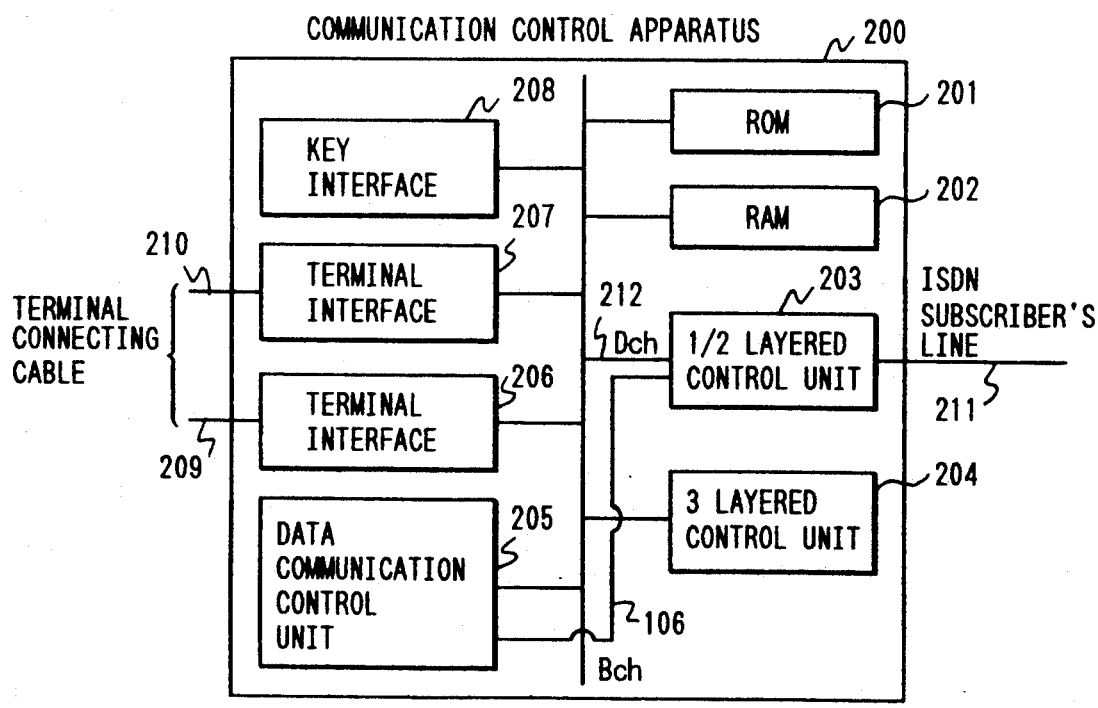
FIG. 2 is a block diagram depicting the structure of a communication control apparatus according to one embodiment of the present invention.

A preferred embodiment of the present invention will hereinafter be described with reference to the accompanying drawings. FIG. 2 is a diagram showing the structure of a communication control apparatus 200 according to one embodiment of the present invention. The communication control apparatus 200 comprises a ROM 201, a RAM 202, a processor 203, a layer-3 type control processor 204, a data communication control processor 205, terminal interface units 206, 207 and a key interface 208. The ROM 201 serves to store therein a program executed by each of the processors of the apparatus. The RAM 202 is used as a control table and data transmitting and receiving buffers. The processor 203 separates a signal inputted from an ISDN subscriber's line 211 into respective signals used for a B channel 106 and a D channel 212, and performs processes for the improper control of a frame of the D channel signal, or the like. Namely, the processor 203 performs layer-1-plus-2 type control in an OSI7 layer-type model. The processor 204 performs control for connection of calls in both communication modes indicative of line and packet switching. The data communication control processor 205 carries out data communications in the communication modes indicative of the line and packet switching, and performs control for data communication made between a data terminal connected to the data communication control apparatus and a receiving station, i.e., a party called. The terminal interface units 206, 207 communicate between the data terminal and the party called through terminal connecting cables 209, 210. The key interface 208 detects a state of a key operated by a user with respect to the communication control apparatus 200 and notifies the result of its detection to corresponding or intended units.

Figure 3:
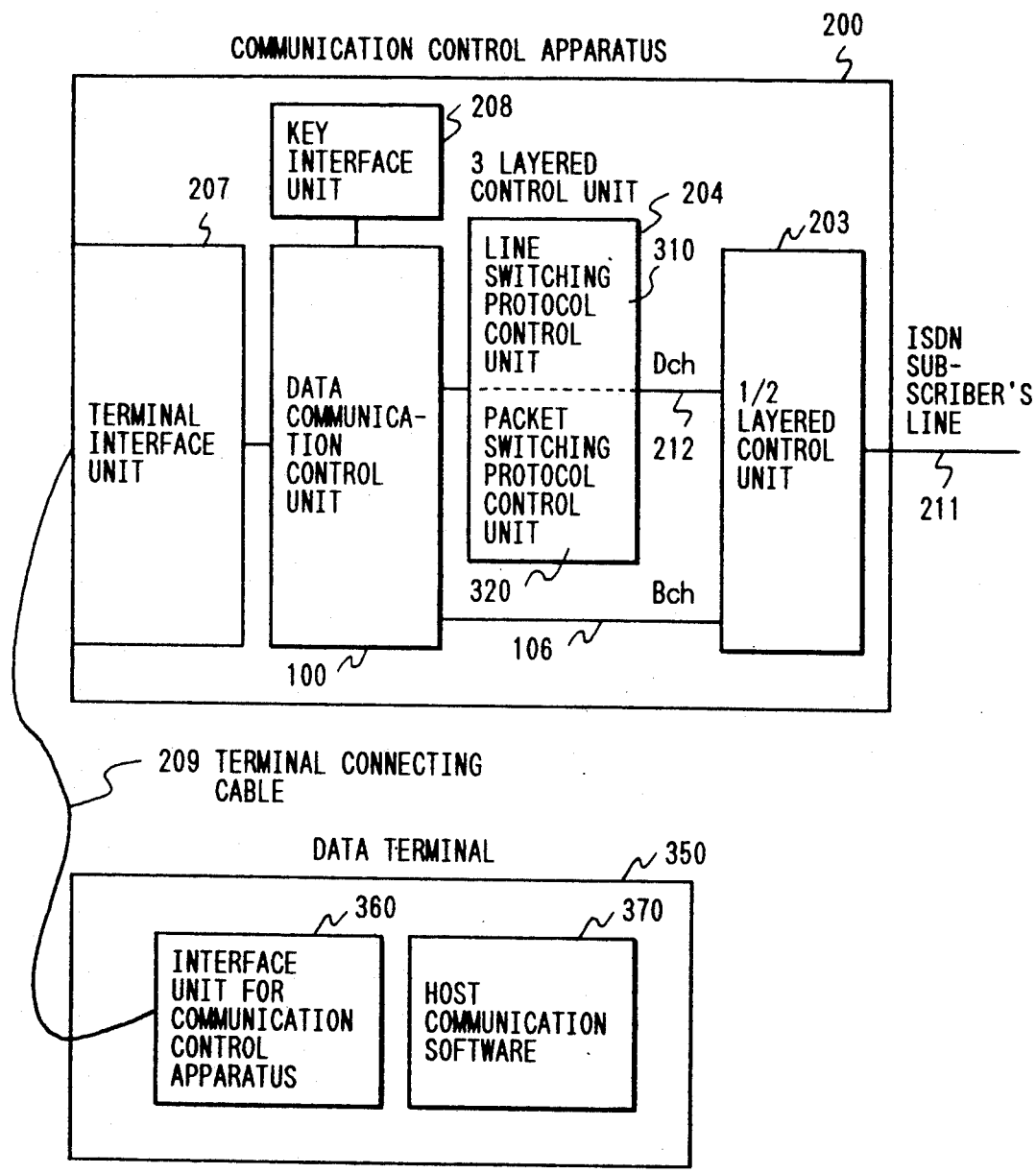
FIG. 3 is a functional block diagram of the communication control apparatus according to said one embodiment of the present invention.

FIG. 3 is a functional block diagram of the communication control apparatus. The layer-3 type control unit 204 comprises a line switching protocol control unit 310 and a packet switching protocol control unit 320. Data are transferred, i.e., transmitted to and received from a host communication software 370 through an interface unit 360 for the communication control apparatus at a data terminal 350.

Figure 4:
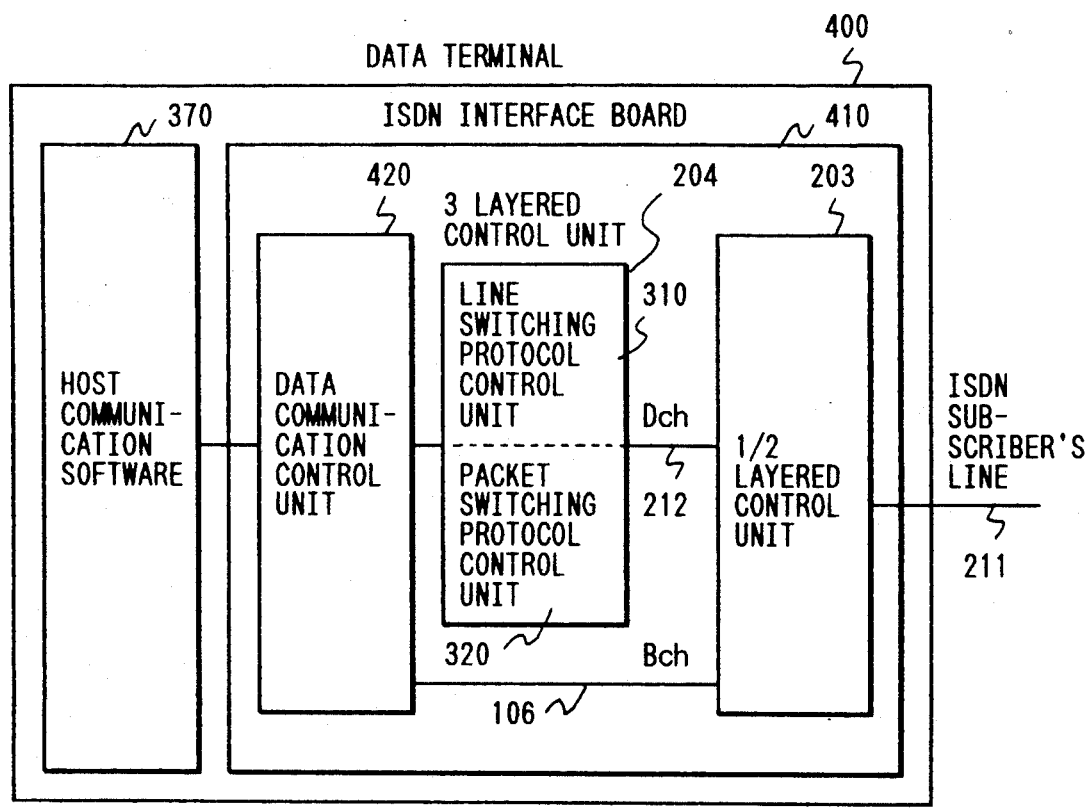
FIG. 4 is a diagram illustrating a modification of the communication control apparatus according to said one embodiment of the present invention.

FIG. 4 is a diagram showing a modification in which each of the communication control apparatus 200 shown in FIGS. 2 and 3 is built in a data terminal 400 as an ISDN interface board 410 The data communication control apparatus 420 may be provided outwardly of the ISDN interface board. A request for the changeover of the communication mode to be performed at the data terminal 400 is made inside the data terminal 400, and thereafter notified to the data communication control apparatus 420 through the host communication software 370.

Figure 26:
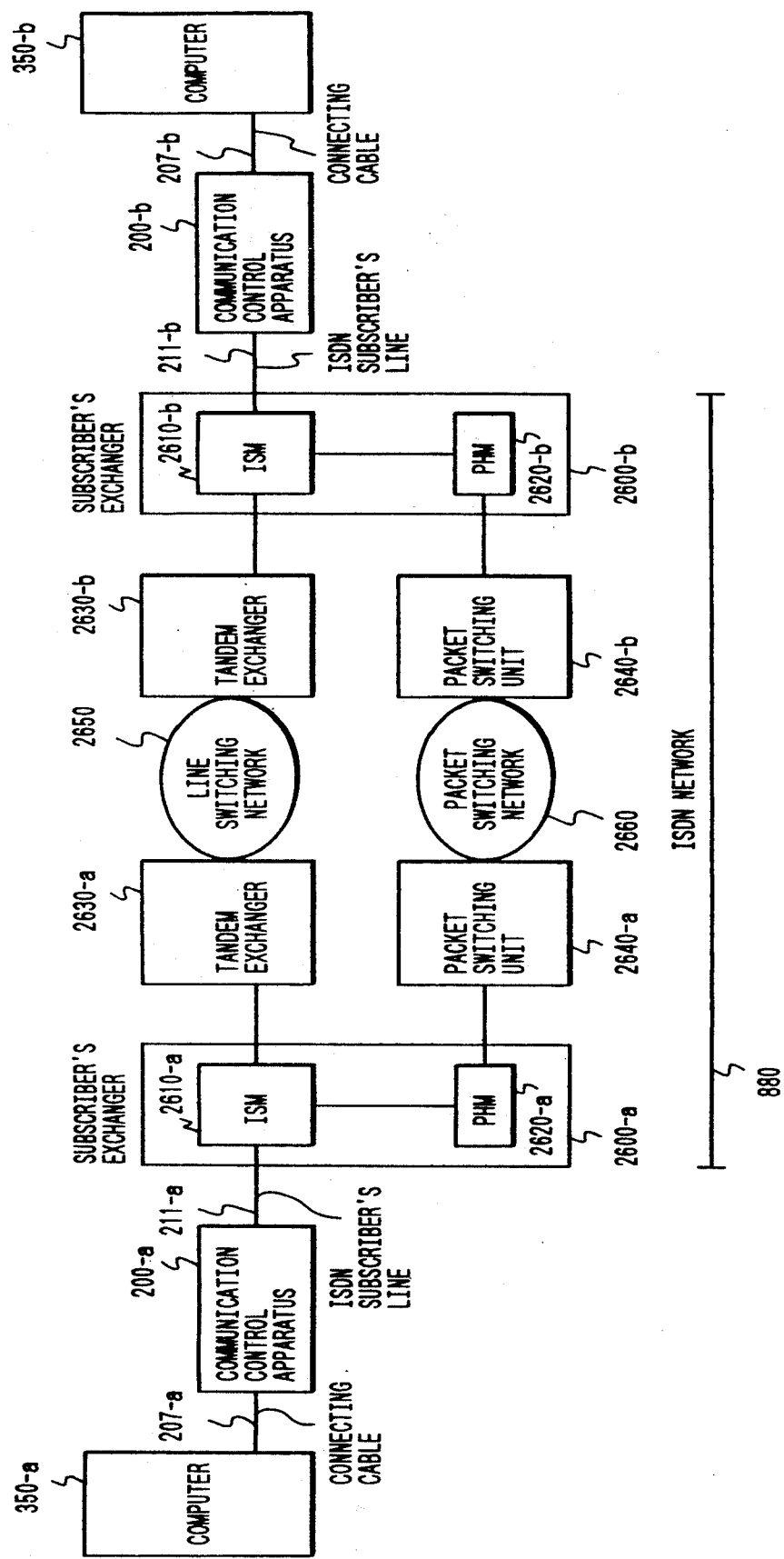
FIG. 26 is a diagram for describing an overall outline of a communication network to which said one embodiment of the present invention is applied.

FIG. 26 shows an overall outline of a communication network to which one embodiment of the present invention is applied. An ISDN 880 as seen from the side of the communication control apparatus 200 comprises subscriber's exchangers 2600 which accommodate subscriber's lines therein, tandem exchangers 2630 each for connecting a line switching network 2650 to each of the subscriber's exchangers 2600, and packet switching units 2640 each for connecting a packet switching network 2660 to each of the subscriber's exchangers 2600. More specifically, as viewed from the communication control apparatus 200, an ISDN subscriber's line 211-a is accommodated in an interface service module (hereinafter called merely "ISM") 2610-a of a subscriber's exchanger 2600-a. Each of the ISM 2610 performs line switching service of ISDN, line switching connection, and connection to a packet handling module (hereinafter called merely "PHM") 2620 for handling a packet call. When the content of communication received at the ISM 2610-a is a request for the line switching, the ISM 2610-a is connected to a tandem exchanger 2630-a. Thereafter, the ISM 2610-a is connected to a tandem exchanger 2630-b connectable to an ISDN subscriber's line 211-b on the side of the called party through the line switching network 2650. Thus, the ISM 2610-a is finally connected to a communication control apparatus 200-b in a communication path opposite to the above path. On the other hand, when the content of communication received at the ISM 2610-a is a request for the packet switching, the ISM 2610-a is connected to a PHM 2620-a. Further, the PHM 2620-a is connected to a packet exchanger 2640-b connectable to the ISDN subscriber's line 211-b on the called party side through a packet exchanger 2640-a and a packet switching network 2660. Thus, the PHM 2620-a is finally connected to the communication control apparatus 200-b in a communication path opposite to the above path. When it is desired to make a dial in line switching form in such a process described above, the communication control apparatus 200 performs communication control between the communication control apparatus 200 and the ISM 2610 by making use of the protocol for the line switching so as to be connected to the line switching network 2650. On the other hand, when it is desired to make a dial in packet switching form, the communication control apparatus 200 performs communication control between the communication control apparatus 200 and the PHM 2620 through the ISM 2610 by making use of the protocol for the packet switching so as to be connected to the packet switching network 2660. When an incoming call is received under the line switching form, the communication control apparatus 200 performs communication control under the line switching protocol in the same manner as when dialing. When an incoming call is received under the packet switching form, the ISM 2610 inquires of the communication control apparatus 200 whether or not interconnection made in the packet switching form can be performed in accordance with the line switching protocol. If it is determined to be positive, then the communication control is made between the PHM 2620 and the communication control apparatus 200 by making use of the packet switching protocol.

Figure 1:
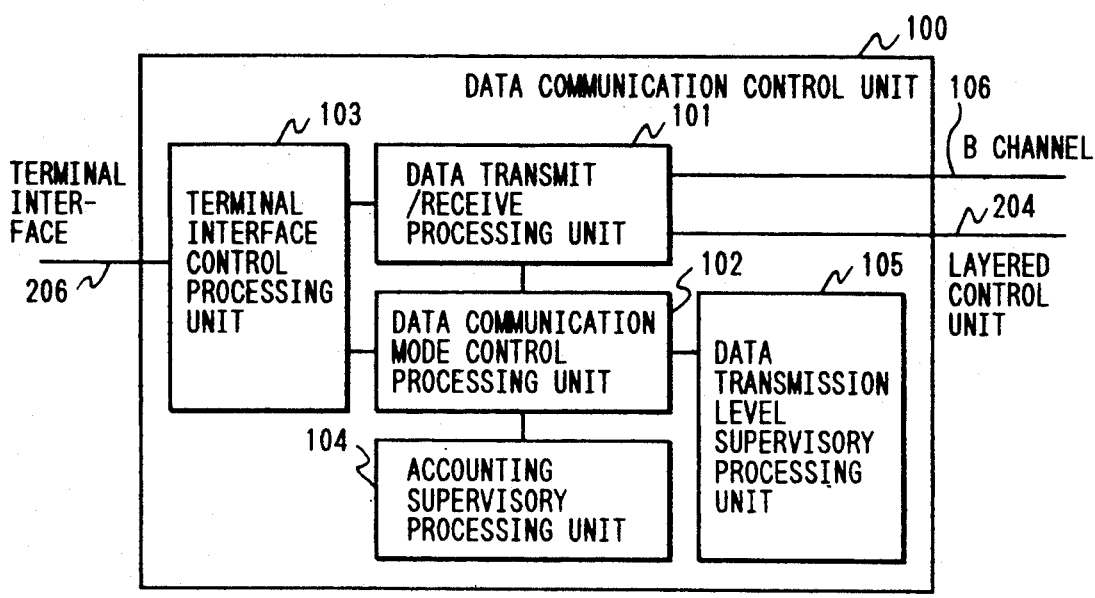
FIG. 1 is a block diagram showing a data communication control unit according to one embodiment of the present invention.

FIG. 1 is a diagram showing the structure of software operated in a data communication control unit 100 according to one embodiment of the present invention. The data communication control unit 100 receives data transferred through a B channel 106, a message delivered from the layer-3 type control processor 204, and data supplied from a terminal interface 206 through a terminal interface control processing unit 103. The data communication control unit 100 comprises a data transmit/receive processing unit 101, a data communication mode control processing unit 102, a terminal interface control processing unit 103, a change-in-account supervisory processing unit 104, and a data transmission level supervisory processing unit 105. The data transmit/receive processing unit 101 receives data relative to a corresponding call so as to process the same, and thereafter transmits the thus-processed data therefrom. The data communication mode control processing unit 102 enters data communication calls onto a table 500 for control of data communication calls shown in FIG. 5 at the time of appearance of the data communication calls, and delete the same therefrom at the time of disappearance thereof. When a data communication-mode changeover request is made, the data communication mode control processing unit 102 performs a process necessary for the data communication-mode changeover. Assuming that a data communication call in line switching form is made, the change-in-account supervisory processing unit 104 changes counted values entered on a table 1500 for control of accounting periods used for line switching calls, and notifies a variation in accounts or charges relative to a corresponding call to the data communication mode control processing unit 102 before such an account variation takes place. When it is desired to automatically change one of data communication modes to another instead of a changeover request from a user, the data transmission level supervisory processing unit 105 supervises in a regular manner whether or not a data communication-mode change-over condition is met. If it is judged to be positive, the data transmission level supervisory processing unit 105 makes a demand of the data communication-mode changeover on the data communication mode control processing unit 102. The terminal interface control processing unit 103 controls the terminal interface 206 and transmits data and commands delivered from the data terminal to each of the data transmit/receive processing unit 101 and the data communication mode control processing unit 102.

FIG. 5 shows the table 500 for control of the data communication calls, which is used to control all the data communication calls with the data communication control unit 100 and the layer-3 type control unit 204 and to register or enter the same therein. The data communication call control table 500 includes the following elements. Namely, it has call identification numbers 501 dedicatedly assigned to all the calls, between the layer-3 type control unit 204 and the data communication control unit 100, a call classification 502 used to identify whether data communication is made in the line switching form or in the packet switching form, numbers 503 of stations or parties called used for storage of addresses on the side of the called parties as the parties subjected to data communication and of subaddresses, a transmit packet number 504 as an area and a receive packet number 505 as an area used to store serial numbers of transmit and receive data packets, respectively, when the data communication is made in the packet switching form, addresses 506 for a transmitting buffer and addresses 507 for a receiving buffer, both of which are used to store addresses, i.e., data of buffers arranged in transmitting and receiving directions for every calls when the data communication is performed, numbers 508 of calls connected, which are used to store data about the correlation between calls-before-communication-mode-changeover and calls-after-communication-mode-changeover when it is desired to change one communication mode to another, busy flags 509 used to show the calls registered in the numbers 508 as storage areas, which are present in the level below the level of a layer 3, changeover flags 510 used to show calls-before-communication-mode-changeover during the communication-mode changeover, and changeover COMPLETE flags 511 used to represent calls subjected to completion of the communication-mode changeover and not subjected to the data communication.

FIG. 6 shows the structure of data as a message 600 for the communication-mode changeover, which is transferred between a transmitting side of a changeover request and its receiving side when it is desired to change one communication mode to another. The message 600 is loaded into a user/user information area 611 in a primitive 610 for control of line switching calls and into a user data area for CALL REQUEST packets at the request of a packet switching call. Then, the message 600 is transferred between the transmitting side and the receiving side. The message 600 comprises the following elements. Namely, it includes a command's name area 601 used to show a message about the communication-mode changeover, an operation indicating area 602 in which an operation about a communication-mode changeover request at the time that the communication-mode changeover is made and an operation about a changeover request such as a changeover REJECT request are written as data, a changeover mode indicating area 603 used to indicate whether or not the transfer of from the line switching to the packet switching is made upon the communication-mode changeover or whether or not the transfer of from packet switching to the line switching is made thereupon, and a transmit data packet number notifying area 604, and a receive data packet number notifying area 605 used to notify a transmit data packet number and a received data packet number, respectively, to the receiving side when a data communication mode prior to that at the time of the communication-mode changeover is represented in the form of packet switching.

Figure 7:
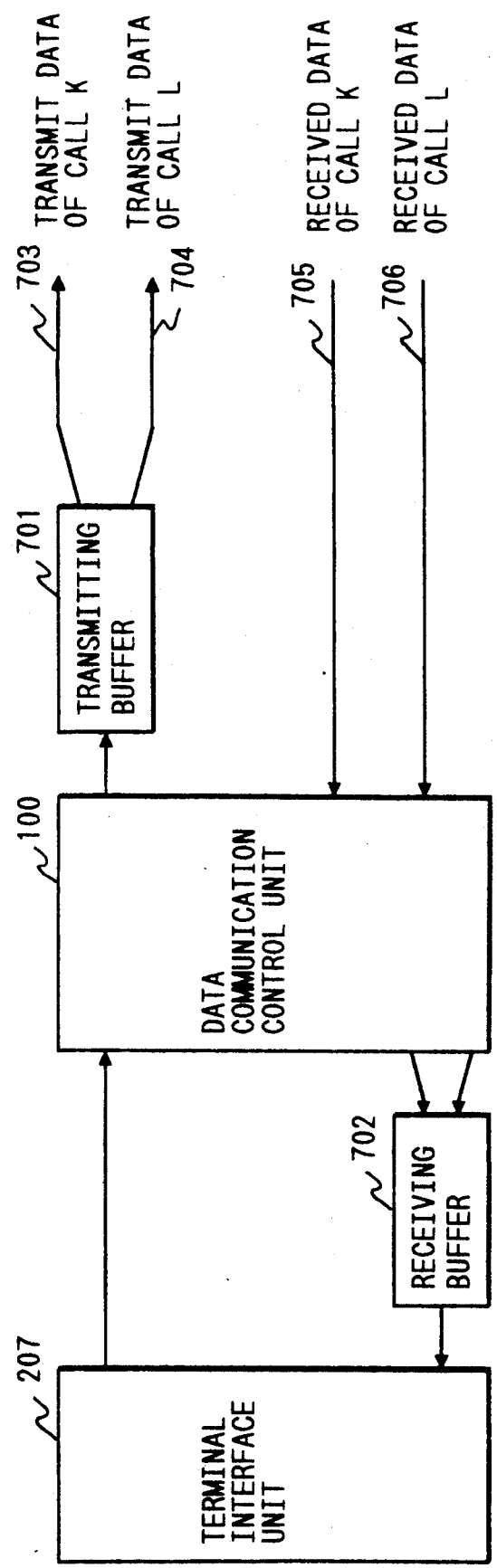
FIGS. 7 and 18 are diagrams showing the structure of transmitting/receiving buffers employed in the communication control apparatus according to said one embodiment of the present invention.

FIG. 7 is a diagram showing the relationship between transmitting/receiving buffers 701, 702 and calls at the time that the transmitting buffer 701 and the receiving buffer 702 are each used in common between two calls subjected to the communication-mode changeover when it is desired to perform the changeover of the data communication mode. When a data communication call is changed from a call K to a call L with the changeover of the data communication mode, the transmitting buffer 701 receives incoming data through the terminal interface unit 207, and transmits the data stored therein as transmit data 703 of a call K before completion of the data communication-mode changeover, whereas it transmits the data as transmit data of a call L after completion of the data communication-mode changeover. The receiving buffer 702 writes therein, as received data of a call K, data to be transmitted through the terminal interface unit 207 and stores therein, before completion of the data communication-mode changeover, and also writes therein, as received data 706 of a call L after completion of the data communication-mode changeover. Namely, a read pointer of the transmitting buffer 701 is changed from the call K to the call L while a write pointer of the receiving buffer 702 is changed from the call K to the call L at the time that the call K is switched to the call L. In this case, each address 506 for the transmitting buffer and each address 507 for the receiving buffer 507 may be registered as they are as the element of the call L in the data communication call control table 500.

FIG. 8 is a diagram showing a sequence of messages transferred among the data communication mode control unit 102, the layer-3 type control unit 204 and an ISDN network 800 during a period in which the data communication-mode changeover is made such that data communication based on the packet switching is changed to data communication based on the line switching after a data communication-mode changeover request is received under data communication (800), in the communication control apparatus 200 according to said one embodiment of the present invention. When it is desired to change the data communication mode from the packet switching to the line switching, an inquiry is first made to the called party as to whether or not the communication mode changeover can be performed. If it is judged to be positive, a process for establishing a data communication call based on the line switching is initiated again. Referring to FIG. 8, a changeover enquiry phase represents a process of from the delivery of a SETUP REQUEST 802 to the reception of a DISCONNECT INDICATION 813 from the receiving side after having received a changeover request 801, whereas a communication-mode changeover phase shows a process of from the delivery of a SETUP REQUEST 814 to the reception of a SETUP CONFIRM 825 from the receiving side. On the other hand, a communication control apparatus B870, to which the data communication-mode changeover request is made, checks whether or not the communication-mode changeover can be performed upon receipt of a SETUP INDICATION 805. Thereafter, the communication control apparatus B870 adds the result of its check to a DISCONNECT REQUEST message 810 and transmit the added result to the next layer. A message transferred mutually between the data communication mode control processing units 102 of the communication control apparatus A860 and the communication control apparatus B870 is represented by a format describing the layout of the changeover message 600 which is incorporated into the user/user information area 611 in the primitive 610 for the control of the line switching call as described above.

Although not shown in FIG. 8, a procedure for notification of a changeover cancel is made in the sequence similar to that of from the delivery of the SETUP REQUEST 802 to the reception of the DISCONNECT INDICATION 813 when a changeover CANCEL request is received during a period of from the reception of the changeover request 801 to the delivery of the SETUP REQUEST QUEST 814 for the changeover of the data communication mode.

When the data communication-mode changeover is rejected on the side of the communication control apparatus B870, the data communication mode control processing unit 102 on the side of the communication control apparatus A860 transmits a request 903 for the reissuance of the changeover request in such a manner that a changeover request command is received in a pseudo manner after a predetermined period of time has elapsed, as shown in FIG. 9. Thus, when the changeover request is completely rejected by the receiving side after it is performed n times, the data communication mode control processing unit 102 notifies changeover failure to the changeover-request side.

In the arrangement shown in FIG. 3, the communication-mode changeover request 801 from the user is made by detecting information inputted by depressing a specific key or a switch on the communication control apparatus 200 with the key interface unit 208 and then transmitting the result of its detection to the data communication control unit 100. In the arrangement depicted in FIG. 4, the changeover request 801 is achieved by detecting information inputted by depressing a hardware key or a software key used for the communication mode changeover, which is provided on the data terminal 400 and then transmitting the result of its detection to the data communication control unit 420 from the host communication software 370.

Figure 10B:
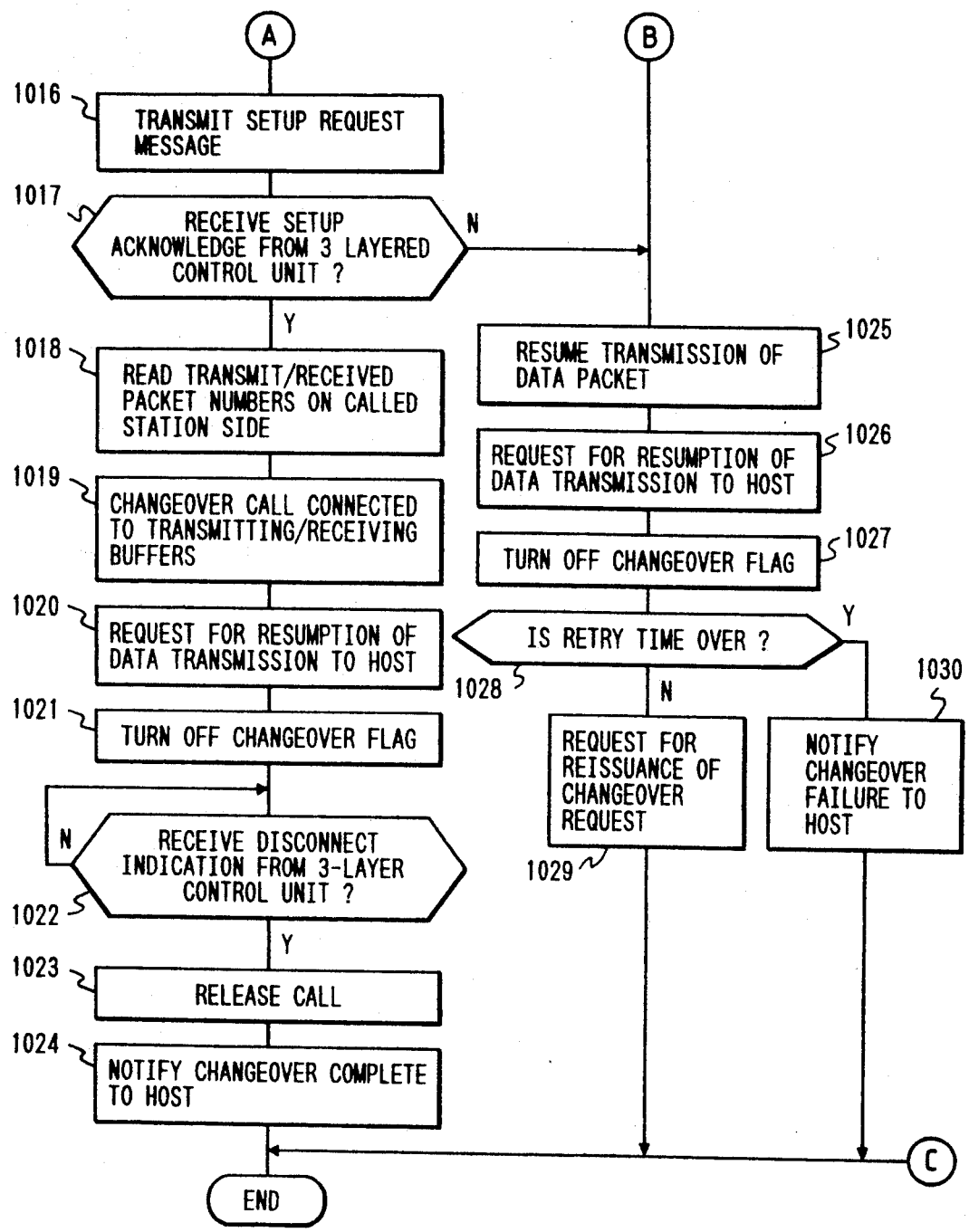
FIGS. 10, 11, 13, 14, 20, 21, 22 and 23 are flowcharts for performing processes for control of data communication modes.

FIG. 10 is a flowchart for describing the process or routines executed in the data communication mode control processing unit 102 of the communication control apparatus A860 when it is desired to perform the changeover of the transmitting and receiving buffers. When a communication-mode changeover request is made so as to be changed from the packet switching to the line switching (801) under data communication (800) based on the packet switching, the changeover processing at that time on the changeover-request side will be described with reference to FIG. 10.

At the time of occurrence of the changeover request (Step 1000), the communication control apparatus is under data communication based on the packet switching. The following respective information as numerical values have been registered in the data communication call control table 500 in association with the respective requests on corresponding call identification numbers

501. Namely, a communication mode registered as the packet switching is registered in the call classification 502. Intended packet numbers are registered in respective columns of the transmit and receive packet numbers areas 504, 505, respectively. Transmit and receive buffer addresses as data while being in use are registered in the addresses 506 for the transmitting buffer and the addresses 507 for the receiving buffer, respectively. In addition, the busy flag indicative of presence of calls having the level corresponding to a layer 3 is in an ON state.

When a communication-mode changeover request for a data communication call is received at the data communication mode control processing unit 102 in such a state (in Step 1000), changeover inquiring commands including the format of the changeover message 600 are edited (in Step 1001). Now, a code indicative of a communication-mode changeover command is entered into the command's name area 601, and a code indicative of a changeover inquiring is entered into the operation indicating area 602. In addition, a code indicative of the fact that the communication mode is changed from the packet switching to the line switching is written into the changeover mode area 603. No information is written into the transmit data packet number area 604 and the receive data packet number area 605. Then, the transmission of a data packet to the receiving side is stopped (Step 1002). It is required for the host communication software 370 to stop the transmission of data to the data communication control unit 100 (Step 1003). Then, the changeover inquiring command is built into the user/user information elements, and address and subaddress information of a call brought into an object to be changed is obtained from a number 503 on the side of one station called, thereby transmitting a SETUP REQUEST message to the line switching protocol control unit 310 of the layer-3 type control unit 204 (Step 1004). After the SETUP REQUEST message has been transmitted to the line switching protocol control unit 310, the data communication mode control processing unit 102 sets a changeover flag 510 in the data communication call control table 500 corresponding to a call subjected to a changeover request, to an ON state (Step 1005). Thereafter, the data communication mode control processing unit 102 is placed on a waiting state to receive a CANCEL NOTIFY for the changeover request given from the user, and a DISCONNECT INDICATION message supplied from the layer-3 type control unit 204 (Steps 1006 and 1007). When the CANCEL NOTIFY for the changeover request is received from the user prior to the reception of the DISCONNECT INDICATION message, a changeover CANCEL command is edited (Step 1008). The thus-edited command indicative of the changeover CANCEL IS entered into the operation indicating area 602. Then, the data communication mode control processing unit 102 transmits a SETUP REQUEST message including the changeover CANCEL command built into the user/user information area 611 to the party to which the changeover request enquiry is made (Step 1009). Thereafter, the data communication mode control processing unit 102 resumes the transmission of a data packet represented in a communication mode prior to that at the time of the changeover (Step 1010), and thereafter makes a demand of resumption of data transmission on the host communication software (1011). Then, the data communication mode control processing unit 102 brings a changeover flag 510 corresponding to a call as an object to be changed into an OFF state (Step 1012), thereby releasing the call by which the changeover enquiry has been executed.

When the layer-3 type control unit 204 receives a DISCONNECT primitive supplied from the party before the CANCEL NOTIFY for the changeover request is received from the user, and the data communication mode control processing unit 102 receives the DISCONNECT INDICATION message (Step 1007), the data communication mode control processing unit 102 takes out one piece of user/user information from the user/user information area 611 (Step 1013). It is then checked (in Step 1014) whether or not one code in the operation indicating area 602 included in the area of the command 600 for the changeover represents changeover acceptance. If it is judged to be positive, the data communication mode control processing unit 102 reads desired data from the transmit data packet number area 504 and the receive data packet number area 505 both used for packet calls as objects to be changed over, and sets the thus-read data to the transmit data packet number area 604 and the received data packet number area 605 in the area of the command 600 for the changeover. Then, a code indicative of the changeover request is entered into the operation indicating area 602. After the changeover request command represented in the above format is edited (Step 1015), the data communication mode control processing unit 102 outputs a SETUP REQUEST message including the changeover request command built into the user/user information area to the party (Step 1016). Thereafter, the data communication mode control processing unit 102 waits for a message delivered from the layer-3 type control unit 204. When the data communication mode control processing unit 102 receives the SETUP REQUEST message (1017), it fetches one piece of user/user information from the user/user information area to read transmit and receive packet numbers on the party side (Step 1018).

Then, data, which has already been received at the called party side, is released from delivery-unacknowledged data which still remain in the transmitting buffer. The transmitting and receiving buffers both used based on the calls-before-changeover are registered in corresponding elements of the data communication call control table 500 as buffers used based on calls-after-changeover, thereby terminating the changeover of the buffer(Step 1019). Then, the data communication mode control processing unit 102 makes a demand of the resumption of data transmission on the host communication software (Step 1020), and sets the changeover flag 510 corresponding to the call as the object to be changed, to the OFF state (Step 1021). If a CLEAR INDICATION packet is received from the party (Step 1022), then the data communication mode control processing unit 102 release the call by which the changeover enquiry has been performed (Step 1023), thereby notifying a communication-mode changeover COMPLETE to the host communication software (Step 1024). In addition, the data communication based on the line switching is initiated at the time of completion of the changeover of the transmitting/receiving buffers.

When the operation indicating code represents a changeover REJECT in Step 1014 or a CLEAR INDICATION message is received form the party called in Step 1017, the data communication mode control processing unit 102 resumes the transmission of a data packet (1025), and makes a demand of resumption of the data transmission on the host communication software (Step 1026). Thereafter, it sets the changeover flag 510 corresponding to the call as the object to be changed over, to the OFF state (1027). Then, it is checked (in Step 1028) whether or not the number of retries of the changeover request reaches a predetermined value. If it is judged to be negative, the data communication mode control processing unit 102 transmits a request for the reissuance of the changeover request to the receiving side (Step 1029). If it is judged to be positive, the data communication mode control processing unit 102 notifies changeover failure to the host communication software (Step 1030).

Figure 11:
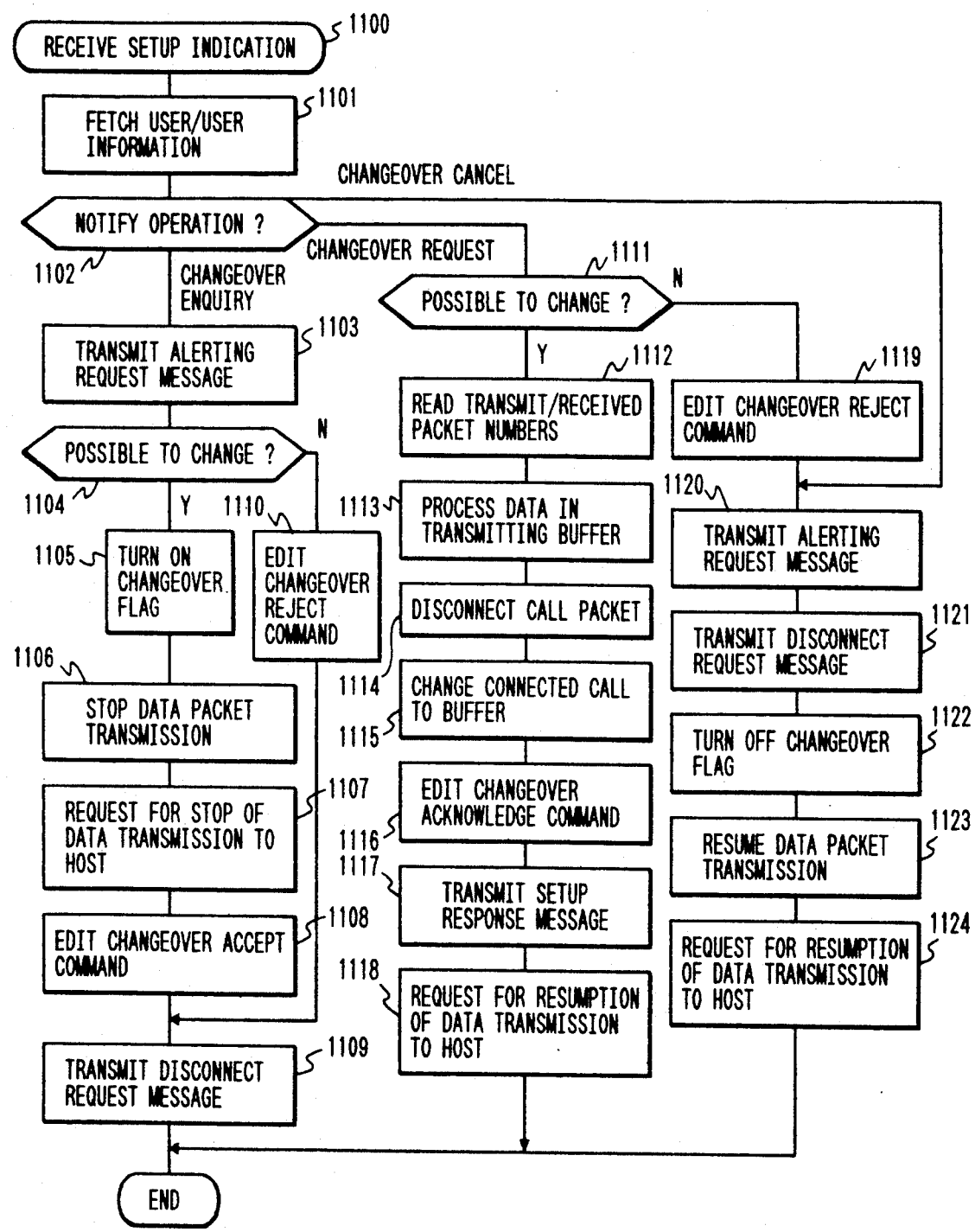

FIG. 11 is a flowchart for describing the process of routines executed in the data communication mode control processing unit 102 of the communication control apparatus B870 shown in FIG. 8. The information similar to that on the side of the communication control apparatus A860 is set in the data communication call control table 500 even on the side of the communication control apparatus B870 under the data communication based on the packet switching.

When the data communication mode control processing unit 102 receives a SETUP INDICATION message (Step 1100), it fetches one piece of user/user information from the user/user information area (Step 1101). It is then checked (in Step 1102) whether or not a code in the operation indicating area 602 included in the area of the changeover command 600 shows a changeover enquiry, a changeover request or a changeover cancel. If it is judged that it is the changeover enquiry, then the data communication mode control processing unit 102 transmits an ALERTING REQUEST message to the layer-3 type control unit 204 (Step 1103). It is then checked whether or not channels are empty so as to determine whether or not a channel changeover can be performed (Step 1104). If it is determined to be positive, then the data communication mode control processing unit 102 brings the changeover flag 510 corresponding to the call subjected to the object to be changed over into the ON state (Step 1105). Then, the data communication mode control processing unit 102 stops the data packet from being transmitted (Step 1106) and makes a demand of stoppage of the data transmission on the host communication software 370 (Step 1107). In addition, a code indicative of the changeover acceptance is entered into the operation indicating code area 602 to thereby edit a changeover acceptance command (Step 1108). If it is judged to be negative, a code indicative of a changeover REJECT is built into the operation indicating code area 602 to thereby edit a changeover REJECT command (Step 1100). Then, the data communication mode control processing unit 102 transmits a DISCONNECT REQUEST message including the changeover ACCEPT command or the changeover REJECT command built into the user/user information area, to the layer-3 type control unit 204 (Step 1109). Thereafter, when the data communication mode control processing unit 102 receives the SETUP INDICATION message again (Step 1100), it takes out a piece of user/user information from the user/user information area (Step 1101). It is then checked whether or not a code in the operation indicating area 602 included in the area of the message 600 for the changeover shows a changeover request. If it is judged to be positive, it is checked again (in Step 1111) whether or not the changeover can be performed. If it is judged to be positive, the data communication mode control processing unit 102 reads the transmit and receive packet number areas 604, 605 in the area of the message 600 (Step 1112). Then, a comparison is made between a number read in the receive packet number area 605 and a number read in the transmit packet number area 604. If they differ from each other, data which has not been yet received by the party called is left in the transmitting buffer 701 (Step 1113). Thereafter, the data communication control processing unit 102 serves to clear a packet call (Step 1114). Then, the previous packet call connected to each of the transmitting and receiving buffers is changed over to a new packet call (Step 1115). Namely, addresses of the calls-before-changeover connected to the transmitting and receiving buffers are delivered up to addresses of calls-after-changeover, in the data communication call control table 500. Then, a code indicative of a changeover ACKNOWLEDGE is entered into the operation indicating area 602 in the area of the message 600, thereby editing a changeover ACKNOWLEDGE command including numbers entered therein in the transmit and receive packet number areas 604, 605 (Step 1116). Thereafter, the data communication mode control processing unit 102 transmits a SETUP RESPONSE message including the changeover ACKNOWLEDGE command built into the user/user information area, to the layer-3 type control unit 204 (Step 1117). Then, it makes a demand of resumption of the data transmission on the host communication software 370 (Step 1118). If the changeover is disabled upon receipt of the changeover request command in Step 1111, then the data communication mode control processing unit 102 edits a changeover REJECT command including a code indicative of a changeover REJECT built into the operation indicating area 602 (Step 1119). Otherwise, the data communication mode control processing unit 102 continuously transmits an ALERTING REQUEST message to the layer-3 type control unit 204 upon receipt of a changeover cancel command in Step 1102, and thereafter transmits a DISCONNECT REQUEST message including the changeover REJECT command built into the user/user information area to the layer-3 type control unit 204 (Step 1121). Thereafter, the data communication mode control processing unit 102 brings a changeover flag corresponding to a call defined as an object to be changed over, into the OFF state (Step 1122). After the delivery of the data packet to the called party is resumed (Step 1123), the data communication mode control processing unit 102 makes a demand of resumption of the data transmission onto the host communication software (Step 1124).

Figure 12:
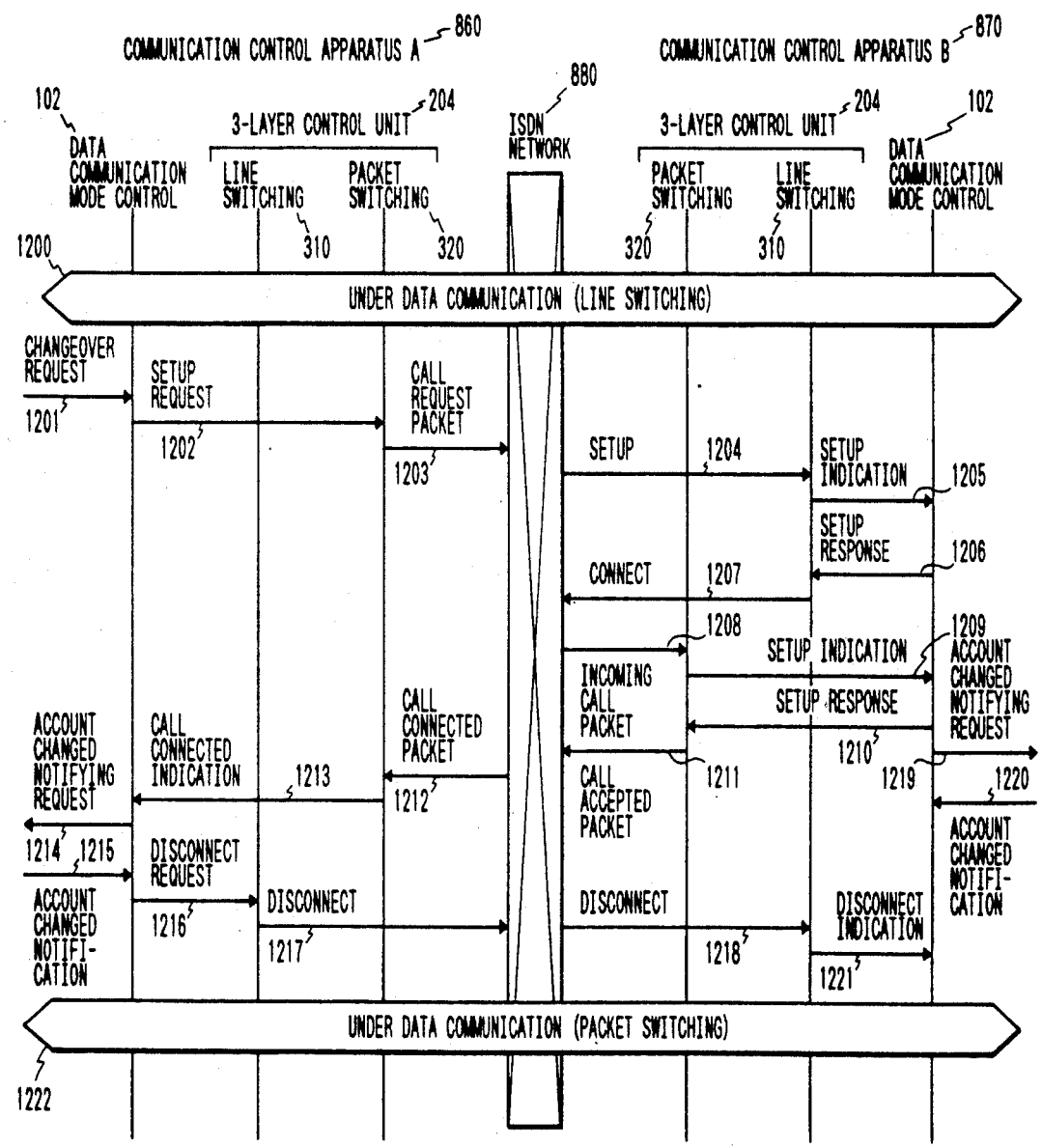

FIG. 12 is a diagram showing a sequence of messages mutually transferred between the communication control apparatus 200 according to said one embodiment of the present invention during a period up to completion of the data communication-mode changeover of from data communication based on the line switching to data communication based on the packet switching after a data communication-mode changeover request is received under data communication (Step 1200) based on the line switching. The data communication-mode changeover of from the line switching to the packet switching differs from that of from the packet switching to the line switching shown in FIG. 8. It is therefore unnecessary to perform the transfer of packet numbers transmitted to the called party and received at the calling party between the two before execution of the changeover. Therefore, as shown in FIG. 12, it is possible to make a changeover enquiry and perform a communication-mode changeover in a single sequence of CALL REQUEST packet. The data communication mode control processing unit 102 performs a process for receiving an account changed notification (Steps 1215, 1220) from the change-in-account supervisory processing unit 104 in order to perform data communication based on the line switching most efficiently at the same account rate (Steps 1214, 1219). Even in this case, all the processing can be performed in a normal CALL REQUEST/INCOMING CALL packet sequence. It is therefore unnecessary to specifically process calls having the level less than that of layer 3 upon changing of one communication mode to another. A CANCEL message for a changeover request 1201 continues to exist up to the reception of the account changed notification under such a sequence. Similarly to the procedure shown in FIG. 8, a request for the reissuance of a changeover request due to a changeover REJECT on the called party side is retried n times so as to transmit the result of its retry to the source of the changeover request.

Figure 13:
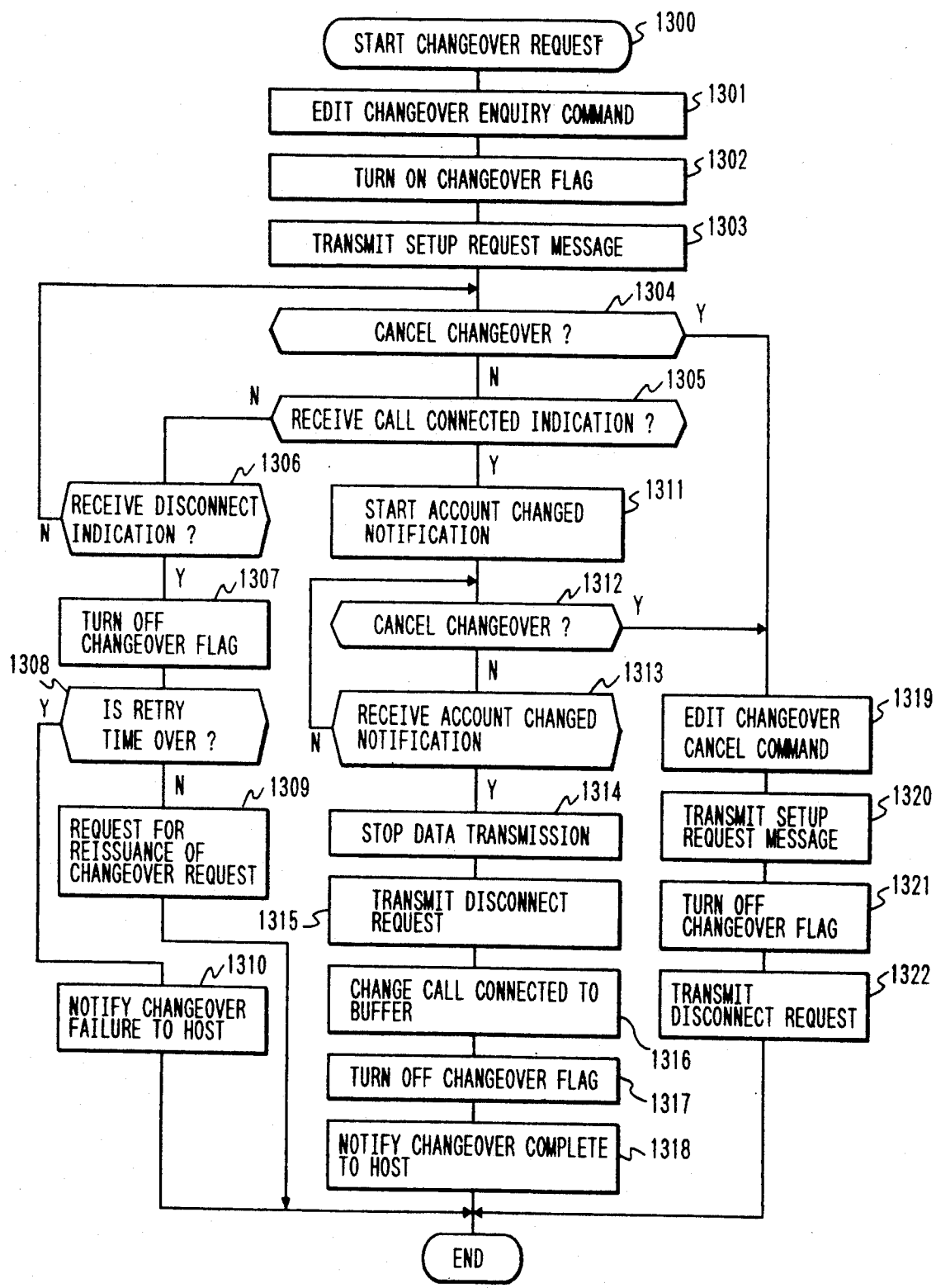
Figure 14B:
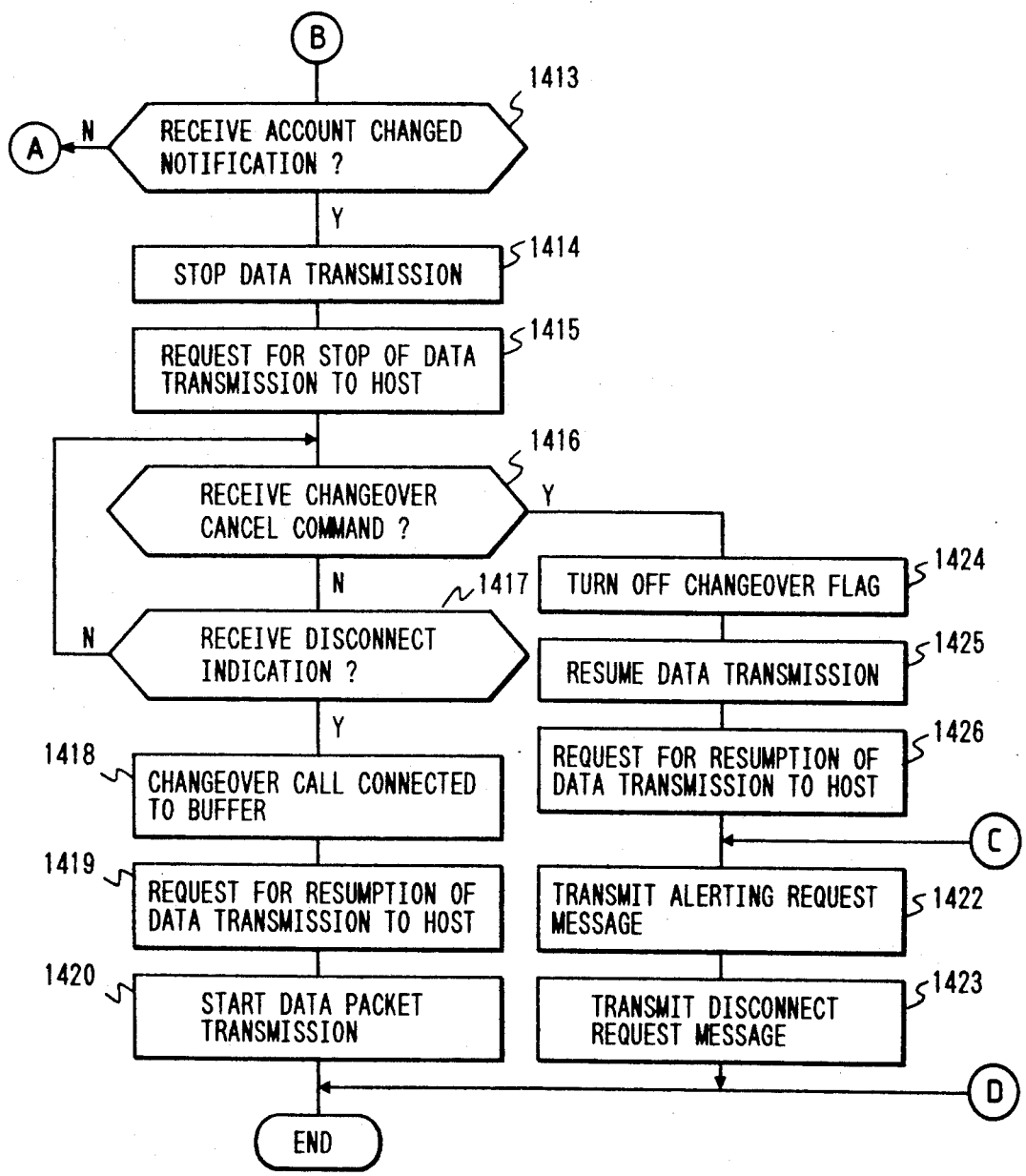

FIG. 13 is a flowchart for describing the process of routines executed in the data communication mode control processing unit 102 of the communication control apparatus A860. Even in this case, the changeover of the transmitting and receiving buffers as shown in FIG. 7 is performed in a manner similar to the process in FIG. 10. A description will be made of the changeover processing on the side of the changeover request with reference to FIG. 13 where a request for the communication-mode changeover of from the line switching to the packet switching is made under data communication (Step 1200) in the form of the line switching. When the data communication-mode changeover request is received under data communication in the line switching form (Step 1300), the data communication mode control processing unit 102 edits a changeover ENQUIRY command (Step 1301). After the data communication mode control processing unit 102 sets a changeover flag 510 corresponding to a call which comes into an object to be changed over, onto an ON state (Step 1302), it transmits a SETUP REQUEST message including a changeover ENQUIRY command built into the user/user information area to the packet switching protocol control unit 320 of the layer-3 type control unit 204 (Step 1303). Thereafter, the data communication mode control processing unit 102 awaits a changeover CANCEL message from the user or a transmit message from the called party (Step 1304, 1305). When the transmit message delivered from the party represents a CLEAR INDICATION (Step 1306), the data communication mode control processing unit 102 sets the changeover flag 510 to the OFF state (Step 1307). It is then checked whether or not the number of retries of the changeover request exceeds a predetermined number of times. If it is judged to be negative, the data communication mode control processing unit 102 transmits a request for the reissuance of the changeover request to the party (Step 1309). If it is judged to be positive, the changeover request is considered as being changeover failure. Thus, the data communication mode control processing unit 102 notifies the changeover failure to the host communication software 370 (Step 1310). When a CALL CONNECTED INDICATION message is received from the party called without receiving a changeover CANCEL request from the user (Step 1305), the data communication mode control processing unit 102 starts or activates the change-in-account supervisory processing unit 104 to be described later in order to perform the communication-mode changeover of from the line switching to the packet switching most efficiently. At this time, NOTIFY REQUEST timing is set to the time of one second before from the occurrence of a change in an account, for example (Step 1311). The data communication mode control processing unit 102 is placed on a waiting state to accept the changeover CANCEL message from the user or an account changed notification from the change-in-account supervisory processing unit 104 (Steps 1312, 1313). Thereafter, when the data communication mode control processing unit 102 receives the account changed notification, it stops the transmission of data to the party called (Step 1314). Then, the data communication mode control processing unit 102 transmits a DISCONNECT REQUEST message corresponding to a call brought into the object to be changed, to the party (Step 1315), and assigns the transmitting and receiving buffers connected to calls-before-changeover as the transmitting and receiving buffers connected to calls-after-changeover (Step 1316). Further, the data communication mode control processing unit 102 sets the changeover flag onto the OFF state (Step 1317), thereby releasing the call-before-changeover. Thereafter, the data communication mode control processing unit 102 notifies a changeover COMPLETE to the host communication software 370 (Step 1318). When the data communication mode control processing unit 102 receives the changeover CANCEL request from the user, it edits a changeover CANCEL command including a code indicative of the changeover CANCEL, which code is built into the operation indicating area 602 in the area for the changeover message 600 (Step 1319). Then, the data communication mode control processing unit 102 transmits a SETUP REQUEST message including the changeover CANCEL command built into the user/user information area, to the layer-3 type control unit 204 (Step 1320), thereby setting the changeover flag 510 corresponding to the call which falls into the object to be changed, to the OFF state (Step 1321). Thereafter, the data communication mode control processing unit 102 transmits a DISCONNECT REQUEST message to the packet switching protocol control unit 320 of the layer-3 type control unit 204 (Step 1322).

FIG. 11 is a flowchart for describing the process of routines executed in the data communication mode control processing unit 102 on the side of the communication control apparatus B870 shown in FIG. 12. When a SETUP INDICATION message is received at the data communication mode control processing unit 102 (Step 1400), the data communication mode control processing unit 102 takes out a piece of user/user information from the user/user information area (Step 1401), and examines whether or not the information thus taken out is a changeover ENQUIRY command (Step 1402). If it is judged to be negative, nothing is done. If it is judged to be positive, the data communication mode control processing unit 102 checks whether or not the data communication mode can be changed from the line switching to the packet switching, judging from the density or level of the transmitted data or the like (Step 1403). If it is judged to be negative, the data communication mode control processing unit 102 transmits an ALERTING REQUEST message to the layer-3 type control unit 204 (Step 1404), and continues to transmit a changeover request message (Step 1405). If it is determined to be positive, the data communication mode control processing unit 102 sets the changeover flag 510 corresponding to the call as the object to be changed, onto the ON state (Step 1406), and thereafter transmits a SETUP RESPONSE message for providing permission of incoming of a packet call to the layer-3 type control unit 204 (Step 1407). Then, the data communication mode control processing unit 102 is placed on a waiting state so as to receive a SETUP INDICATION message from the layer-3 type control unit 204 (Step 1408). When the SETUP INDICATION message is received, the data communication mode control processing unit 102 takes out a piece of user/user information from the user/user information area so as to check whether or not the information thus taken out is a changeover CANCEL command (Step 1409). If it is judged to be negative, the data communication mode control processing unit 102 transmits a SETUP RESPONSE message to the layer-3 type control unit 204 (Step 1410). The data communication mode control processing unit 102 establishes timing for the account changed notification in such a manner that the account changed notification can be received at the time of 1.5 seconds before from the occurrence of an actual change in an account, for example, and activates the change-in-account supervisory processing unit 104 (Step 1411). Thereafter, the data communication mode control processing unit 102 is kept on a waiting state to receive a changeover CANCEL command (Step 1412) or the account changed notification from the party called (Step 1413). When the data communication mode control processing unit 102 receives the account changed notification from the called party, it stops the transmission of data in the line switching form (Step 1414), and makes a demand of stoppage of the data transmission on the host communication software 370 (Step 1415). Thereafter, the data communication mode control processing unit 102 is placed on a waiting state to receive a changeover CANCEL command or a DISCONNECT INDICATION message from the called party (Steps 1416, 1417). When the data communication mode control processing unit 102 receives a DISCONNECT INDICATION message with respect to the call as the changed object in which the changeover flag 510 is brought into the ON state (Step 1417), the data communication mode control processing unit 102 assigns the transmitting and receiving buffers connected to the calls-before-changeover to those connected to calls-after-changeover (Step 1418). After the data communication mode control processing unit 102 makes a demand of resumption of the data transmission on the host communication software 370 (Step 1419), it starts the transmitting of data packet to the called party (Step 1420). When the changeover CANCEL command is received from the called party in Steps 1409, 1412, the data communication mode control processing unit 102 sets the changeover flag 510 onto the OFF state (Step 1421) and transmits the ALERTING REQUEST message to the called party (Step 1422). Thereafter, the data communication mode control processing unit 102 transmits a DISCONNECT REQUEST message to the layer-3 type control unit 204 (Step 1423). When the changeover CANCEL command is received in Step 1416, the changeover flag 510 is brought into the OFF state (Step 1424). After the data communication based on the line switching is resumed (Step 1425), the data communication mode control processing unit 102 makes a demand of resumption of the data transmission on the host communication software 370 (Step 1426). Thereafter, the data communication mode control processing unit 102 transmits the ALERTING REQUEST message and the DISCONNECT REQUEST message to the layer-3 type control unit 204, thereby disconnecting a connected call.

Figure 17:
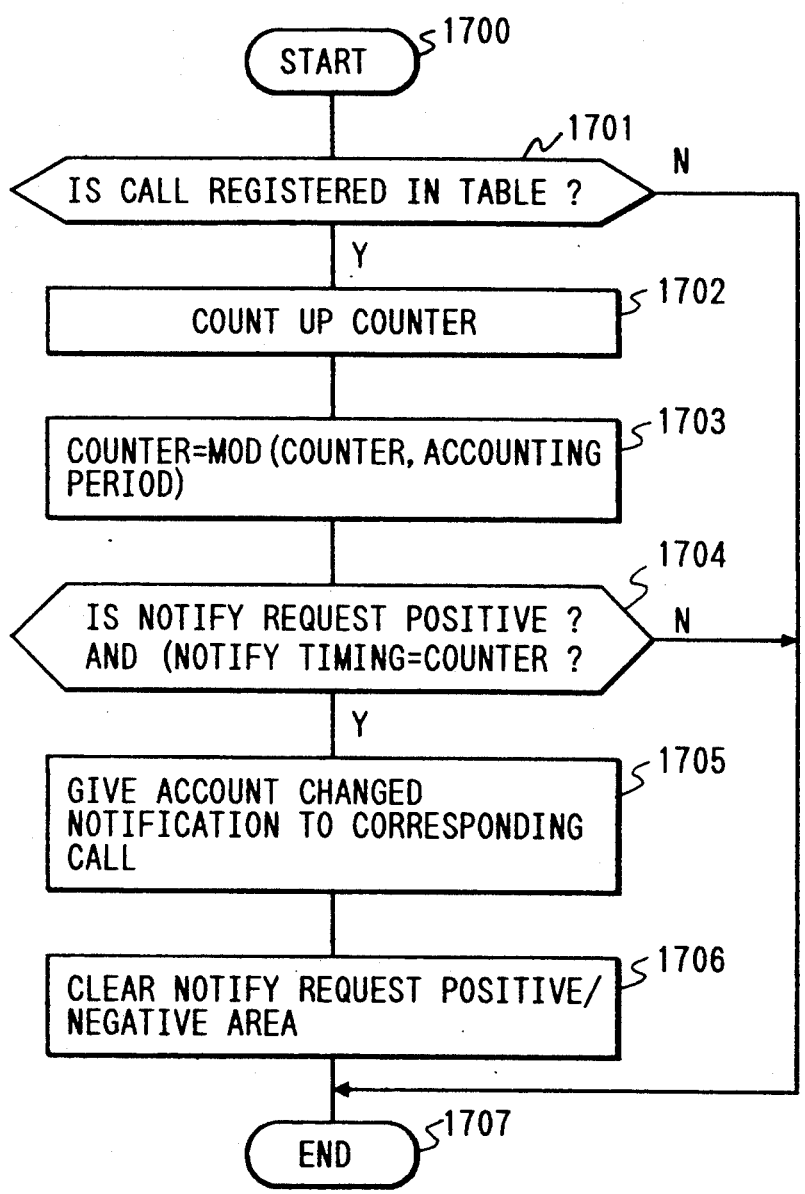
FIG. 17 is a flowchart of a process for supervising accounts changed.

The operation of the change-in-account supervisory processing unit 104 will be described with reference to FIGS. 15, 16 and 17. FIG. 15 shows a table 1500 for control of accounting period used for a line switching call. When data communication calls based on the line switching are produced, all the calls are registered in the control table 1500. A table 1600 for retrieval of accounting period shown in FIG. 16 is retrieved from the sides of the transmitting and receiving stations so as to determine a time (in second) required for an account-varying cycle or period from the result of its retrieval and the communication time. A value obtained by converting the above time into the unit of a start-up cycle or period of the change-in-account supervisory processing unit 104 to be described later is registered in an account-varying period area 1520. When it is desired to receive an account changed notification at the time of m seconds before in which an account or charge varies upon demanding of an account changed notification on the change-in-account supervisory processing unit 104, a value obtained from the expression (account-varying period—m)/(start-up period for the change-in-account supervisory processing) is set to a NOTIFY request positive/negative area 1530. The account-varying timing is monitored by a counter 1540 which count up one by one in the start-up period of the change-in-account supervisory processing unit 104. FIG. 17 is a flowchart for describing a process of routines executed in the change-in-account supervisory processing unit 104. The process is caused to start periodically in accordance with an OS for controlling the execution of a program in the data communication control unit 100 (Step 1700). It is then checked whether or not a call is registered in the control table 1500 (Step 1701). If it is judged to be positive, 1 is added to a value counted by the counter 1540 (Step 1702). If it is judged to be negative, nothing is done. Each value counted by the counter 1540 is subjected to a module in an accounting period (Step 1703). It is then checked whether or not an account changed notification time is registered in the NOTIFY request positive/negative area 1530. If it is judged to be positive, it is further checked whether or not the counted value of the counter 1540 is equal to a value in the NOTIFY request positive/negative area 1530 (Step 1704). If it is judged to be positive, information indicative of a variation in the account or charge for the call subjected to a NOTIFY request is set up and thereafter notified to the data communication mode control processing unit 102 (Step 1705), thereby clearing the value in the NOTIFY request positive/negative area 1530 (Step 1706). If it is judged to be negative, nothing is done. The call subjected to the request for the account changed notification can be notified before a lapse of a predetermined period of time corresponding to the variation in the account in accordance with the above processing.

As described above, FIGS. 10, 11, 13 and 14 have shown and described the routine procedures in the case where the transmitting and receiving buffers are used in common between the call-before-changeover and the call-after-changeover as shown in FIG. 7. Alternatively, a description will hereafter be made of a routine procedure in the case where the transmitting and receiving buffers are provided separately with respect to the call-before-changeover and the call-after-changeover as shown in FIG. 18.

Figure 18:
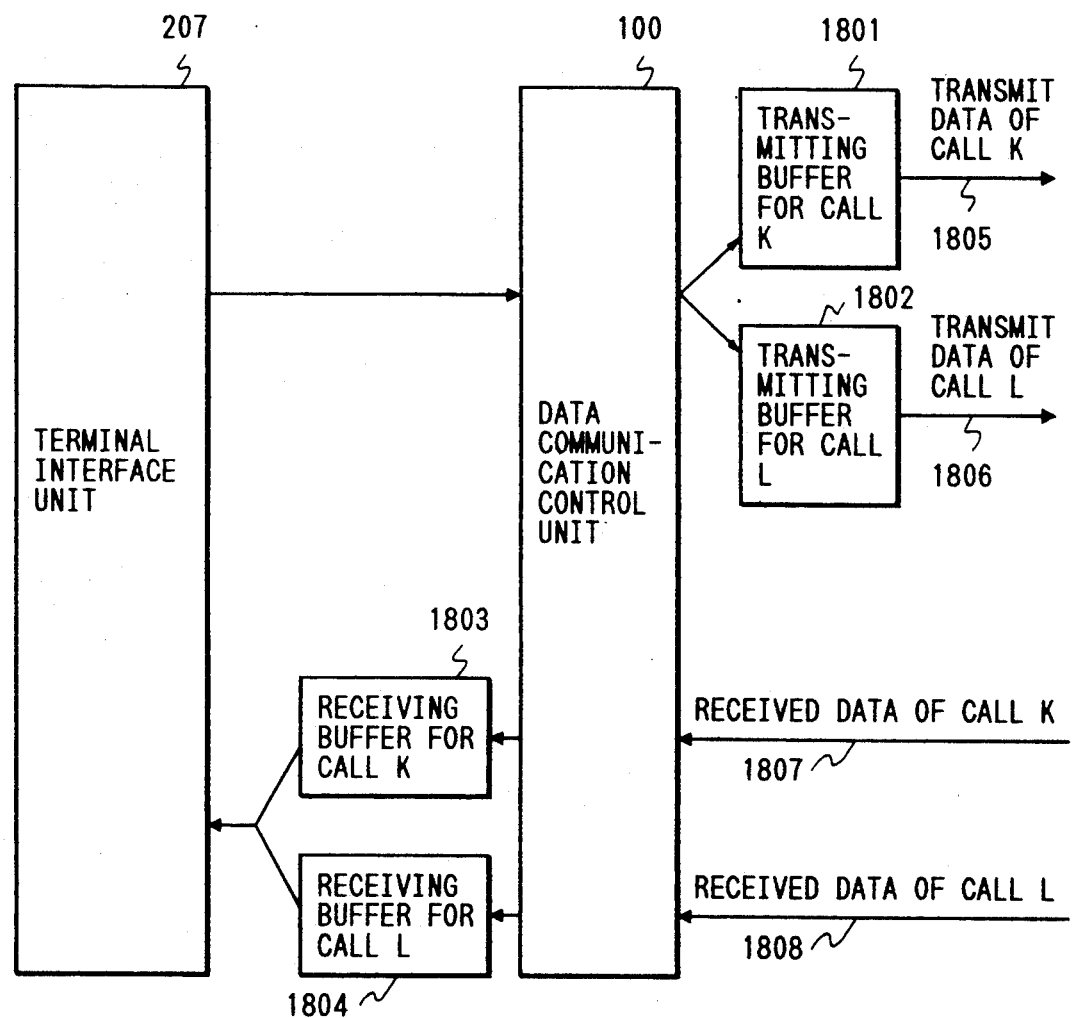
Figure 19:
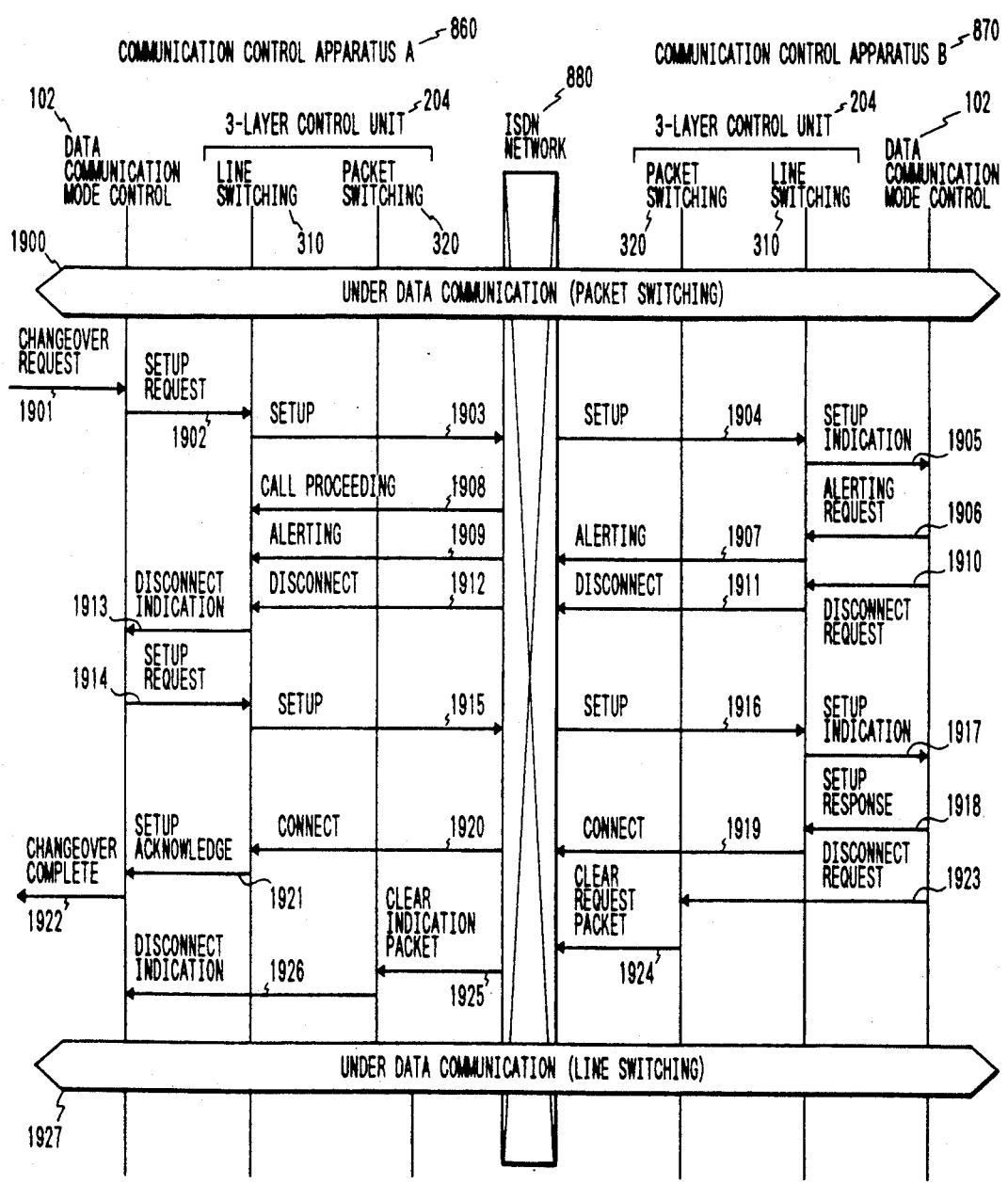

FIG. 18 shows the relationship between the transmitting/receiving buffers and the calls in the case where upon performance of the data communication-mode changeover, two sets of calls subjected to its changeover are associated with the transmitting and receiving buffers, respectively in a separate manner. When a call K is changed to a call L with the data communication-mode changeover, a pair of transmitting and receiving buffers (1801, 1803) for the call K is switched over to a pair of transmitting and receiving buffers (1802, 1804) for the call L. Since the present method of assigning the buffers differs from that shown in FIG. 7 and data communication can be performed simultaneously with the call-before-changeover and the call-after-changeover even after the data communication-mode changeover has been done, it is necessary to store information about the relationship between the buffers-before-changeover and the buffers-after-changeover, in both of the transmitting and receiving sides FIG. 19 is a diagram showing a sequence of messages at the time that the data communication mode is changed from the packet switching to the line switching where the buffer assignment shown in FIG. 18 is made. The present sequence is substantially the same as that shown in FIG. 8. However, the transmitting and receiving buffers are assigned for every calls and hence a packet call-before-changeover is not released until all the data transmitted in the form of the packet call-before-changeover are received. Therefore, the data communication mode control processing unit 102 connects a line switching call to the layer-3 type control unit 204 without disconnecting a packet switching call (1919), after a SETUP INDICATION message is received in a phase for changeover of the data communication mode on the side of the communication control apparatus B870 (1917). The DISCONNECT INDICATION of the packet call is performed after all the data packets transmitted from the called party are received (1923).

Figure 20B:
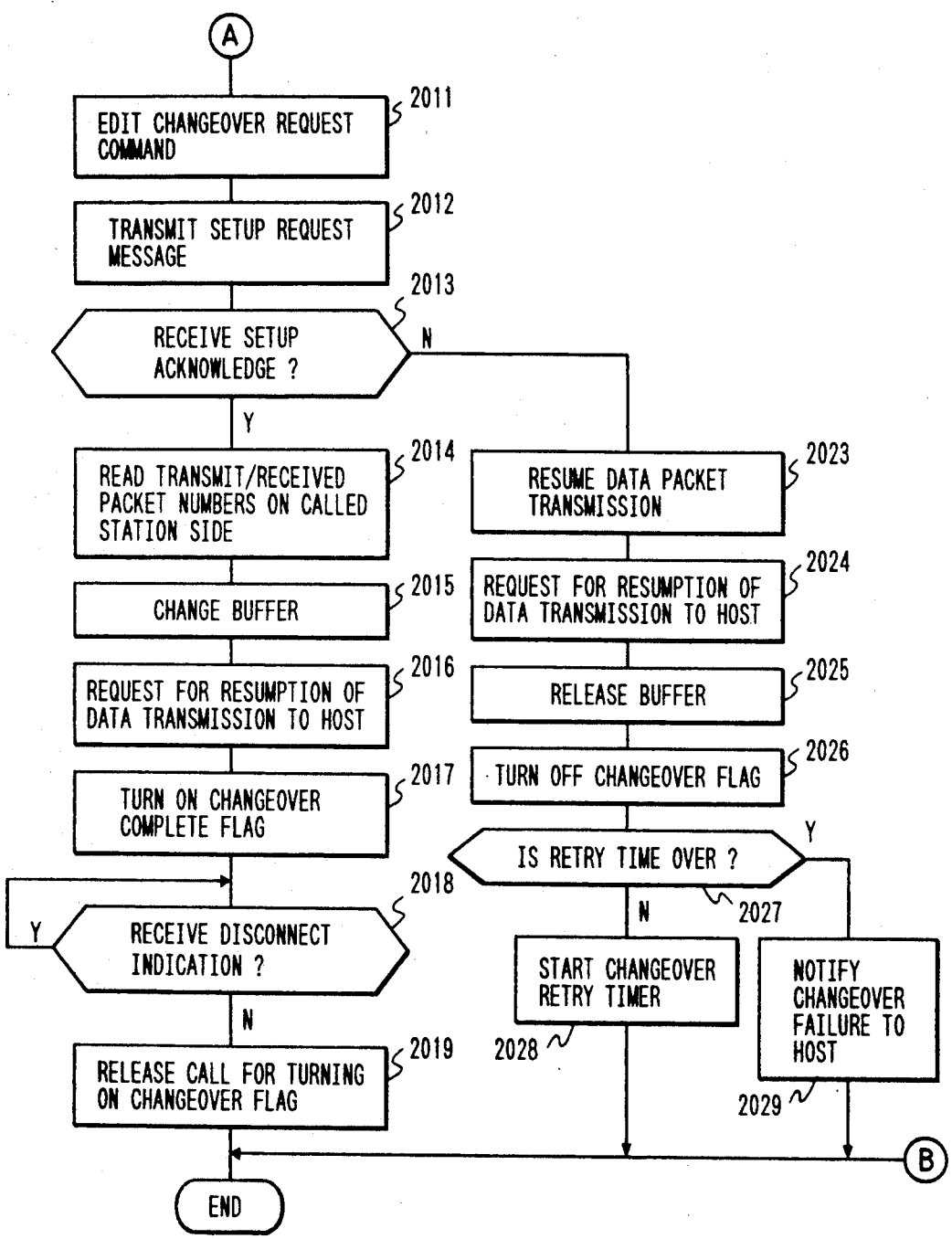

FIG. 20 is a flowchart for describing the process of routines executed in the data communication mode control processing unit 102 on the side of the communication control apparatus A860 in which a request for the communication-mode changeover of from the packet switching to the line switching is made, in the case where the call-before-changeover and the call-after-changeover are associated with the discrete transmitting and receiving buffers. A description will now be made of a process on the side of the changeover request at the time that the data communication mode is changed from the packet switching to the line switching with reference to FIG. 20.

When a changeover REQUEST is received from the user (Step 2000), the data communication mode control processing unit 102 edits a changeover ENQUIRY command (Step 2001), and transmits a SETUP REQUEST message including the thus-edited command built into the user/user information area to the layer-3 type control unit 204 (Step 2002). Then, the data communication mode control processing unit 102 sets the changeover flag 510 corresponding to a call as an object to be changed, to the ON state (Step 2003). Thereafter, the data communication mode control processing unit 102 is kept on a waiting state so as to receive a DISCONNECT INDICATION message from the called party (Steps 2004, 2005). When the DISCONNECT INDICATION message is received from the called party, it fetches a piece of user/user information from the user/user information area (Step 2006). Then, it is checked whether or not data in the operation indicating area 602 in the area for the changeover message 600 represents a code indicative of changeover acceptance (Step 2007). If it is judged to be positive, the data communication mode control processing unit 102 stops the transmitting of a data packet of the call as the object to be changed, to the party called (Step 2008). Then, the data communication mode control processing unit 102 makes a demand of stoppage of the data transmission on the host communication software 370 (Step 2009). In addition, new transmitting and receiving buffers are assigned to calls for performing the changeover (Step 2010). Thereafter, the data communication mode control processing unit 102 edits a changeover REQUEST command with a transmit data packet number and a receive data packet number set therein (Step 2011), and then transmits a SETUP REQUEST message including the so-edited command built into the user/user information ares to the layer-3 control unit 204 (Step 2012). Thereafter, the data communication mode control processing unit 102 is kept on a waiting state to receive a SETUP CONFIRM message from the called party (Step 2013). On the other hand, when the SETUP CONFIRM message is received from that party, the data communication mode control processing unit 102 takes out a piece of user/user information from the user/user information area so as to read desired numbers from the transmit data packet number area 604 and the receive data packet number area 605 on the called-party side (Step 2014). Thereafter, the transmitting and receiving buffers are each switched over, i.e., connected to a line switching call which is to be newly changed (Step 2015). The data communication mode control processing unit 102 makes a demand of resumption of the data transmission on the host communication software 370 (Step 2016), and sets a changeover COMPLETE flag 511 indicative of the changeover completion to the ON state (Step 2017). Then, the data communication mode control processing unit 102 is placed on a waiting state to receive a DISCONNECT INDICATION message corresponding to a call which falls into the object to be changed (Step 2018). After it receives that message, it releases the call relative to the changeover flag 510 brought into the ON state, and sets the changeover COMPLETE flag 511 onto the OFF state (Step 2019). When a changeover CANCEL request is received from the user in Step 2004, the data communication mode control processing unit 102 edits a changeover CANCEL command (Step 2020), and delivers a SETUP REQUEST message including the so-edited changeover CANCEL command entered into the user-/user information area to the layer-3 type control unit 204 (Step 2021), thereby setting the changeover flag 510 to the OFF state. When information in the operation indicating area 602 is a code indicative of changeover rejection in Step 2007, the data communication mode control processing unit 102 brings the changeover flag 510 into the OFF state (Step 2022). When a DISCONNECT INDICATION message is received instead of reception of the SETUP CONFIRM message in Step 2013, the data communication mode control processing unit 102 resumes the transmission of a data packet (Step 2023), and makes a demand of resumption of the data transmission on the host communication software 370 (Step 2024). Then, it also releases, i.e., deactivates the transmitting and receiving buffers assigned to the newly-changed line switching call (Step 2025), and sets the changeover flag 510 corresponding to the call as the object to be changed, to the OFF state (Step 2026). It is then checked whether or not the number of retries of the changeover exceeds a predetermined number of times (Step 2027). If it is judged to be negative, the data communication mode control processing unit 102 transmits a request for the reissuance of the changeover request to the called party (Step 2028). If it is judged to be positive, it notifies changeover failure to the host communication software 370 (Step 2029).

Figure 21B:
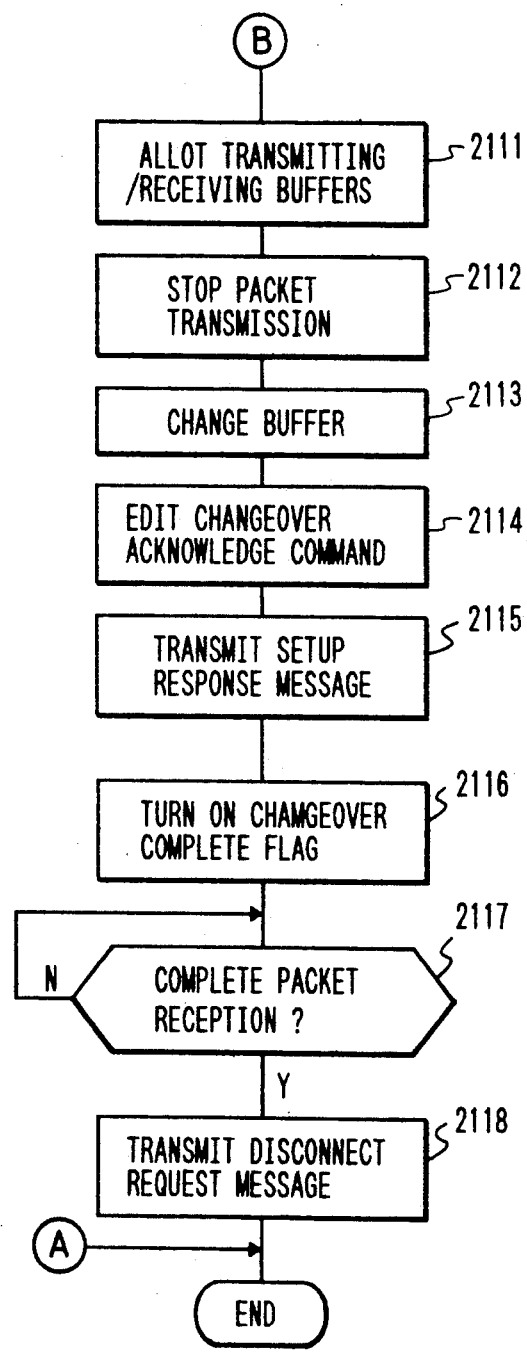

FIG. 21 is a flowchart for describing the process of routines executed in the data communication mode control processing unit 102 on the side of the communication control apparatus B870 shown in FIG. 19. A description will now be made of a routine process on the side subjected to the changeover request in the case where the data communication mode is changed from the packet switching to the line switching with reference to FIG. 21.

When a SETUP INDICATION message is received from the layer-3 type control unit 204 (Step 2100), the data communication mode control processing unit 102 takes out a piece of user/user information from the user/user information area (Step 2101), and examines whether information in the operation indicating area 602 of the area for the changeover message 600 shows a code indicative of a changeover enquiry, a changeover request or a changeover cancel (Step 2102). If it is judged to be positive, the data communication mode control processing unit 102 transmits an ALERTING REQUEST message to the layer-3 type control unit (Step 2103). Then, it is checked whether or not the data communication mode can be changed from the packet switching to the line switching (Step 2104). If it is judged to be positive, the data communication mode control processing unit 102 sets the changeover flag 510 corresponding to a call brought into an object to be changed, to the ON state (Step 2105), and edits a changeover acceptance command (Step 2106). Then, the data communication mode control processing unit 102 transmits a DISCONNECT REQUEST message including the so-edited changeover acceptance command built into the user/user information area, to the layer-3 type control unit 204 (Step 2107). If it is judged to be negative in Step 2104, the data communication mode control processing unit 102 edits a changeover REJECT command (Step 2108), and delivers a DISCONNECT REQUEST message including the thus-edited changeover REJECT command built into the user/user information area to the layer-3 type control unit 204 (Step 2107). When the SETUP INDICATION message is received again after that (Step 2100), the data communication mode control processing unit 102 takes out a piece of user/user information from the user/user information area (Step 2101), and examines the contents of the operation indicating area in the area for the changeover command (Step 2102). If a code represented in the operation indicating area 602 shows a changeover request, it is checked whether or not the changeover request can be performed (Step 2109). If it is judged to be positive, the data communication mode control processing unit reads number information from the transmit and receive data packet number areas 604, 605 on the called-party side, of the area for the changeover message 600 (Step 2110). Then, the data communication mode control processing unit 102 assigns each of the transmitting and receiving buffers to a newly-changed call (Step 2111), stops the delivery of the data packet to the party (Step 2112), performs the changeover of the transmitting and receiving buffers (Step 2113), and enters the read number information as the transmit and receive data packet numbers into a changeover ACKNOWLEDGE command so as to edit the thus-entered changeover ACKNOWLEDGE command (Step 2114). Then, the data communication mode control processing unit 102 transmits a SETUP RESPONSE message including the thus-edited changeover ACKNOWLEDGE command built into the user/user information area to the layer-3 type control unit 204 (Step 2115), and sets the changeover COMPLETE flag 511 corresponding to the call-after-changeover to the ON state (Step 2116). Thereafter, the data communication mode control processing unit 102 compares a transmit packet number on the called-party side and a data packet number inputted to its own terminal thereby checking whether or not the packet reception is terminated (Step 2117). If it is judged to be positive, the data communication mode control processing unit 102 transmits a DISCONNECT REQUEST message to the packet switching protocol control unit 320 of the layer-3 type control unit 204 (Step 2118). If it is judged to be negative in Step 2109, the data communication mode control processing unit 102 edits the changeover REJECT command (Step 2119), and delivers the ALERTING REQUEST message to the called party (Step 2120). Thereafter, the data communication mode control processing unit 102 transmits the DISCONNECT REQUEST message including the changeover REJECT command built into the user/user information area to the layer-3 type control unit 204 (Step 2121), and sets the changeover flag 510 corresponding to the call as the object to be changed to the OFF state (Step 2122). When the changeover message 600 as the user/user information in the SETUP INDICATION message represents a changeover CANCEL command, the data communication mode control processing unit 102 transmits an ALERTING REQUEST message to the layer-3 type control unit 204 (Step 2120), and delivers a DISCONNECT REQUEST message to the layer-3 type control unit 204 (Step 2121), after which the changeover flag 510 corresponding to the call as the changed object is set to the OFF state (Step 2122).

Figure 22B:
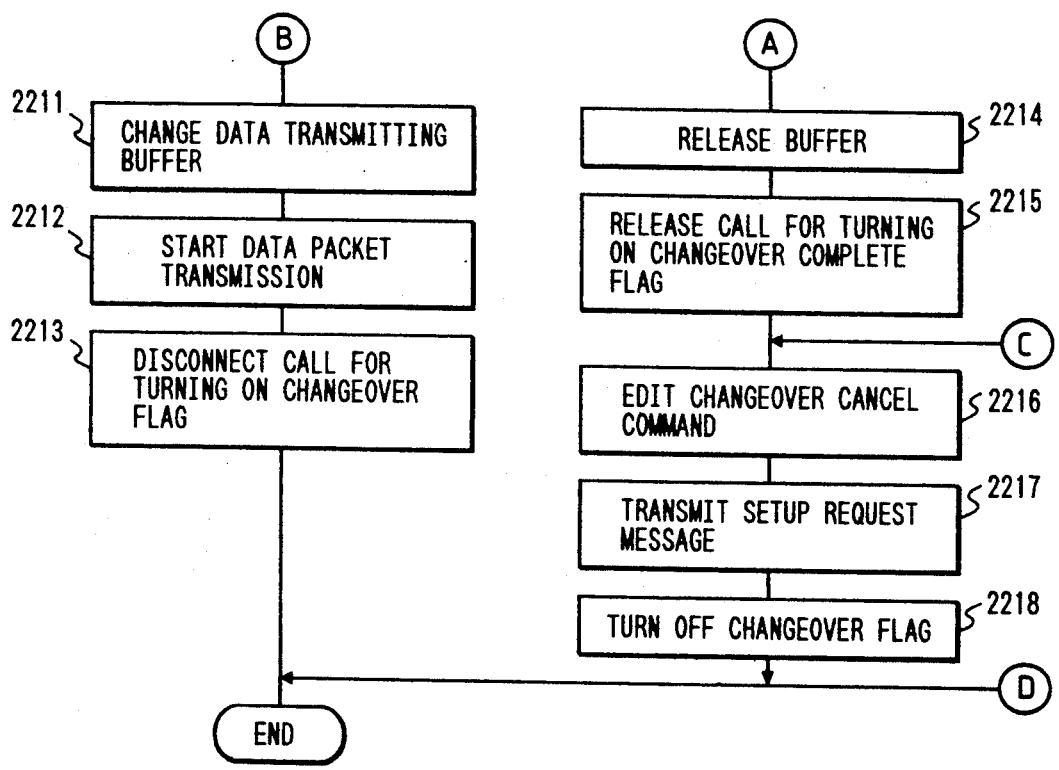

FIG. 22 is a flowchart for describing the process of routines executed in the data communication mode control processing unit 102 on the side of the communication control apparatus A860 shown in FIG. 12 where the data communication mode is changed from the line switching to the packet switching and the transmitting and receiving buffers shown in FIG. 18 are assigned. A description will now be made of a routine process on the changeover-request side of the communication mode with reference to FIG. 22.

When a request for the changeover of the communication mode is received (Step 2200), the data communication mode control processing unit 102 edits a changeover ENQUIRY command (Step 2201), and sets the changeover flag 510 corresponding to the call as the object to be changed to the ON state (Step 2202). Thereafter, it transmits a SETUP REQUEST message including the changeover ENQUIRY command built into the user/user information area to the layer-3 type control unit 204 (Step 2203). Then, the data communication mode control processing unit 102 is placed on a waiting state to receive a changeover CANCEL request from the user or a call connected indication message from the called party (Steps 2204, 2205). When the call connected indication message is received from the called-party side, the data communication mode control processing unit 102 assigns each of the transmitting and receiving buffers to a new call (Step 2206), and sets the changeover COMPLETE flag 511 to the ON state (Step 2207). Then, the data communication mode control processing unit 102 sets NOTIFY timing to the time of one second before form the occurrence of the change in the account, for example, in order to obtain the timing for changing the communication mode from the line switching to the packet switching, and starts or activates the change-in-account supervisory processing unit 104 (Step 2208). Thereafter, the data communication mode control processing unit 102 is kept on a waiting state to receive a changeover CANCEL request or an account changed notification from the user (Steps 2209, 2210). When the account changed notification is received, the data communication mode control processing unit 102 performs the changeover operation of the transmitting and receiving buffers so as to effect a changeover of from a call relative to the flag 510 set to the ON state to a call relative to the changeover COMPLETE flag 511 set to the ON state (Step 2211), and starts to transmit a data packet (Step 2212). Then, the data communication mode control processing unit 102 serves to disconnect the call relative to the changeover flag 510 set to the ON state (Step 2213). When the changeover CANCEL request is received from the user in Step 2209, the data communication mode control processing unit 102 releases the buffers assigned in Step 2206 and releases the call relative to the changeover COMPLETE flag 511 set to the ON state (Step 2215). Thereafter, the data communication mode control processing unit 102 edits a changeover CANCEL command (Step 2216), and transmits a SETUP REQUEST message including the so-edited changeover CANCEL command built into the user/user information to the layer-3 type control unit 204 (Step 2217), thereby setting the changeover flag 510 corresponding to the call which falls into the object to be changed, to the OFF state (Step 2218). When a DISCONNECT INDICATION message is received in Step 2205 (Step 2219), the changeover flag 510 corresponding to the call as the changed object is set to the OFF state (Step 2220). It is then checked whether or not the number of retries of the changeover request exceeds a predetermined number of times. If it is judged to be negative (Step 2221), a request for the reissuance of the changeover request is delivered to the called party (Step 2222). If it is judged to be positive, the data communication mode control processing unit 102 notifies changeover failure to the host communication software 370 (Step 2223). When the changeover CANCEL request is received from the user in Step 2204, the data communication mode control processing unit 102 edits a changeover CANCEL command (Step 2216), and transmits a SETUP REQUEST message including the so-edited changeover command incorporated into the user/user information area to the layer-3 type control unit 204 (Step 2217), thereby setting the changeover flag 510 corresponding to the call as the changed object to the OFF state (Step 2218).

Figure 23B:
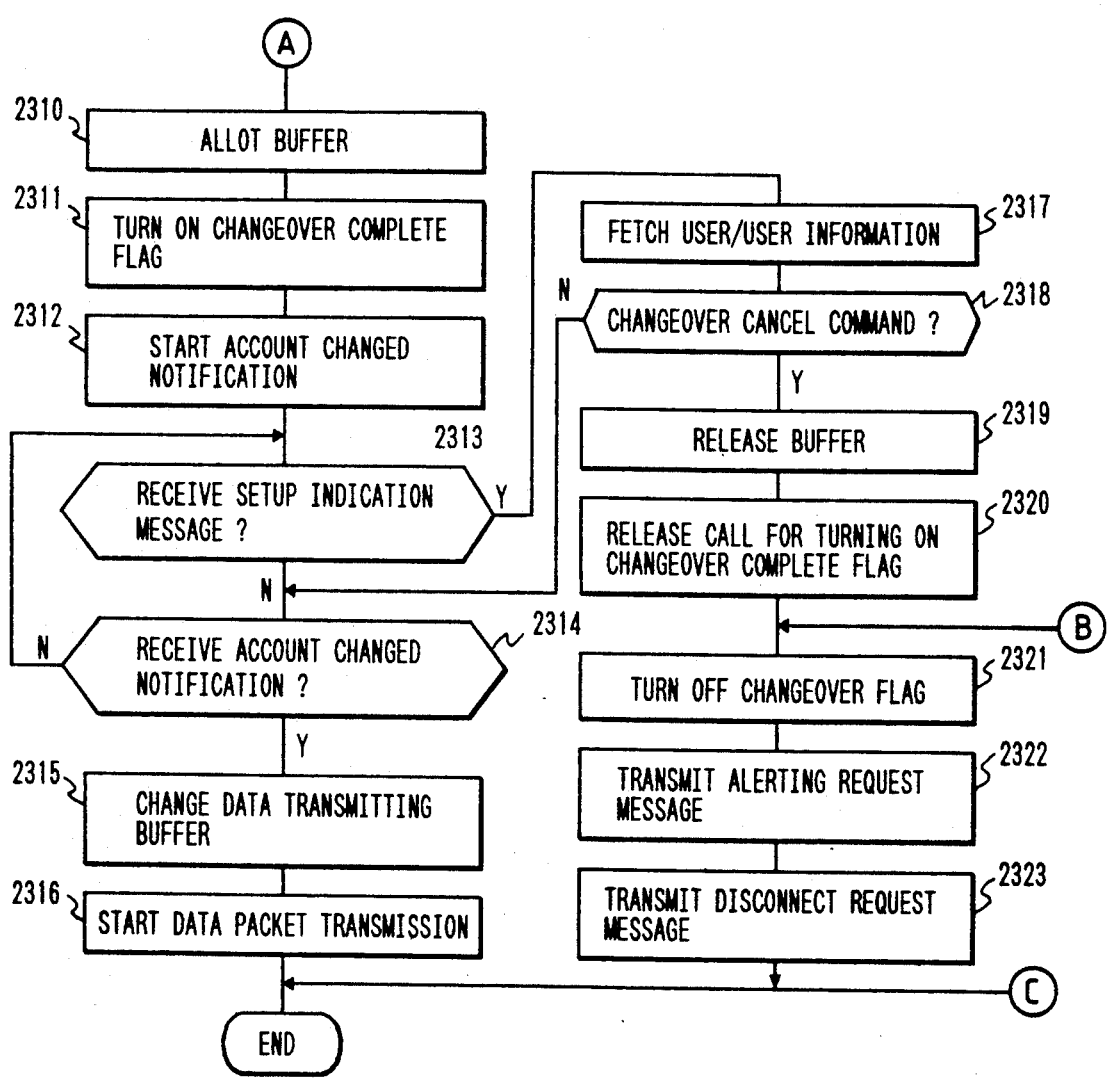

FIG. 23 is a flowchart for describing the process of routine executed in the data communication mode control processing unit 102 in the communication control apparatus B870 on the side opposite to the side of the communication-mode changeover request of from the line switching to the packet switching as shown in FIG. 22. A description will now be made of a routine process on the side subjected to the changeover request in the case of the communication-mode changeover with reference to FIG. 23.

When a SETUP INDICATION message is received from the called party (Step 2300), the data communication mode control processing unit 102 takes out a piece of user/user information from the user/user information area (Step 2301), and examines whether or not information about the message thus received is a changeover ENQUIRY command (Step 2302). If it is judged to be negative, nothing is performed. When the changeover ENQUIRY command is received, it is checked whether or not the communication mode can be changed from the line switching to the packet switching (Step 2303). If it is determined to be positive, the data communication mode control processing unit 102 sets the changeover flag 510 corresponding to a call brought into an object to be changed, to the ON state (Step 2304), and delivers a SETUP RESPONSE message to the layer-3 type control unit 204 (Step 2305). Thereafter, it is kept on a waiting state to receive a SETUP INDICATION message (Step 2306). When the SETUP INDICATION message is received, the data communication mode control processing unit 102 takes out a piece of user-/user information from the user/user information area (Step 2307) so as to check the contents in the operation indicating area of the area for the changeover message 600. Then, it is checked whether or not the contents thereof represent the changeover ENQUIRY command (Step 2308). If it is judged to be positive, the data communication mode control processing unit 102 transmits the SETUP RESPONSE message to the layer-3 type control unit 204 (Step 2309). Then, it assigns each of the transmitting and receiving buffers to a new call (Step 2310), and sets the changeover COMPETE flag 511 to the ON state (Step 2311). Thereafter, the data communication mode control processing unit 102 sets NOTIFY timing to the time of 1.5 seconds before from the occurrence of a variation in the rate of account, for example, in order to obtain the timing for changing the communication mode from the line switching to the packet switching, so as to activate the change-in-account supervisory processing unit 104 (Step 2312). Then, the data communication mode control processing unit 102 is placed on a waiting state to receive the SETUP INDICATION message or an account changed notification (Steps 2313, 2314). When the account changed notification is received, a buffer for the data transmission is changed to a buffer associated with the new call (Step 2315), and the transmission of the data packet to the called party is initiated (Step 2316). When the SETUP INDICATION message is received in Step 2313, the data communication mode control processing unit 102 takes out a piece of use/user information (Step 2317), and examines whether or not it represents a changeover CANCEL command (Step 2318). If it is judged to be positive, the data communication mode control processing unit 102 releases or clears the buffers each assigned to the new call relative to the changeover COMPLETE flag 511 set to the ON state (Step 2319), and releases a call relative to the changeover COMPLETE flag 511 set to the ON state (Step 2320). Thereafter, the data communication mode control processing unit 102 sets the changeover flag 510 corresponding to the call as the changed object, to the OFF state (Step 2321), and transmits an ALERTING REQUEST message to the layer-3 type control unit 204 (Step 2322), after which a DISCONNECT REQUEST message is delivered to the layer-3 type control unit 204 (Step 2323). When the changeover CANCEL command is received in Step 2308, the data communication mode control processing unit 102 sets the changeover flag 510 corresponding to the call as the object to be changed, to the OFF state (Step 2321), and delivers the ALERTING REQUEST message to the layer-3 type control unit 204 (Step 2322), after which the DISCONNECT REQUEST message is delivered thereto (Step 2323). If it is judged to be negative in Step 2303, the data communication mode control processing unit 102 edits a changeover REJECT command (Step 2324), and transmits the DISCONNECT REQUEST message including the so-edited changeover REJECT command built into the user/user information area to the layer-3 type control unit 204 (Step 2315). According to the present embodiment, as has been described above, the communication-mode changeover of from the packet switching to the line switching can be performed in accordance with the changeover request from the user. Thus, the data communication can be carried out in the most effective communication mode.

A description will now be made of one embodiment as a means for automatically delivering a data communication-mode changeover request to a data communication control unit 100.

Figure 25B:
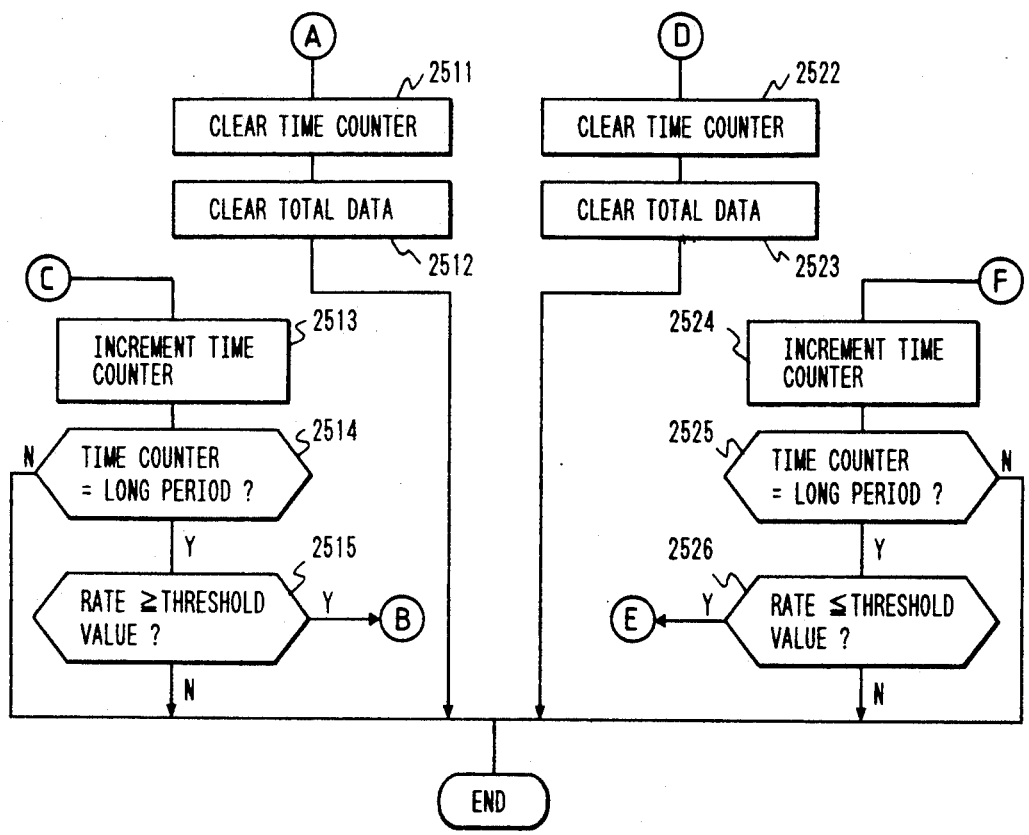
FIG. 25 is a flowchart for describing a routine procedure performed at a communication-mode changeover request generating unit.

FIG. 24 shows a table 2400 for supervising data communication, the table 2400 being used to supervise the amount of data communication of data communication calls and to make a communication-mode changeover request when the relationship between the communication mode under communication and the amount of the data communication is brought into a certain state. According to said one embodiment of the present invention, the rate of generation of data and its acceleration for each interval of a constant period are calculated at intervals of the constant period. A counter used for the communication changeover is incremented and/or decremented according to a judgment as to whether the rate of the data generation is above or below than the threshold value determined by the communication mode under communication. When the upper threshold value for changing the communication mode from the packet switching to the line switching under communication in the packet switching form at present exceeds k time (for example, k=3), it is judged that the rate of the data generation has exceeded the data processing rate in the packet switching provided that its acceleration is not made negative at the time of exceeding the same, thereby making a communication-mode changeover request. When the amount of transmitted data is measured in a period long than that used to measure the rate of the data generation (for example, in a period of 50 times that of its rate), and the rate of the data generation calculated based on the so-measured data amount exceeds the threshold value, a communication-mode changeover request is made to the called party. The table 2400 includes the following elements, i.e., a call identification number 2401, a communication mode 2402, a buffer write pointer 2403, a buffer write pointer 2404 of one period before, a communication-mode before-changeover 2405, a total amount of data 2406 in a longer period, a counter 2407 representing increments and decrements with respect to the upper and lower threshold values, and acceleration 2408 for the data generation. FIG. 25 is a flowchart for describing the process of routines executed in the data transmission level supervisory processing unit 105.

The above process is caused to periodically start at regular intervals by the OS (Step 2500). The data transmission level supervisory processing unit 105 reads a write pointer of a transmitter buffer associated with each of data communication calls (Step 2501). Then, it determines the difference between a value of the thus-read pointer and a value of a write pointer of one period before and divides the difference by a start-up period, thereby calculating the rate of the data generation at an interval of the start-up period (Step 2502). Then, the acceleration for the data generation at an interval of the preset period is determined from the difference between the data generation rate at the present period and that defined one period before, and it is then checked whether the generation of data tends to increase or decrease (Step 2503). Then, the data transmission level supervisor processing unit 105 rewrites, i.e., brings the area relative to the buffer write pointer up to data (Step 2504). When the measured data generation rate exceeds the upper threshold value (Step 2505), the counter 2407 is incremented. When a value counted by the counter 2407 is made negative at this time, it is reset to zero (Step 2506). When the counted value exceeds a prescribed value K (for example, k=30) after the counter 2407 is activated (Step 2507), it is determined whether the acceleration is positive or negative (Step 2508). If it is judged to be positive, a judgment is made as to whether or not the present communication mode is packet switching (Step 2509). If it is judged to be positive, the data transmission level supervisory processing unit 105 gives a communication-mode changeover request to the data communication mode control processing unit 102 (Step 2510). Then, it clears a time counter for counting a long period (Step 2511), and clears an area for the total data amount 2406 (Step 2512). When the communication mode is line switching in Step 2509, the changeover request for the communication mode is not performed. When the counted value is smaller than K or the acceleration is made negative in Steps 2507 and 2508, the time counter is incremented (Step 2513). When the period in the time counter is set equal to the long period (Step 2514), the data generation rate at the long period is calculated. In addition, it is checked whether or not the thus-calculated rate exceeds the upper threshold value (Step 2515). If it exceeds the upper threshold value, a judgment is made as to whether or not the communication mode is packet switching (Step 2509). Hereafter, the process similar to that described above is performed. If the measured value is smaller than the upper threshold value in Step 2505, an examination is made as to whether or not the measured value is smaller than the lower threshold value (Step 2516). If it is determined that it is smaller than the lower threshold value, the counter 2407 is decremented (Step 2517). Then, it is checked whether or not the absolute value of the counted value exceeds the predetermined value K (Step 2518). If it is determined to be positive, an examination is made as to whether or not the acceleration of the data generation is less than zero (Step 2519). If it is judged to be positive, an examination is made as to whether or not the present communication mode is line switching (Step 2520). If it is judged that it is line switching, then the data transmission level supervisory processing unit 105 delivers a communication-mode changeover request to the data communication mode control processing unit 102 (Step 2521). Then, it clears the time counter (Step 2522), and also clears the area for the total data amount 2406 (Step 2523). If the communication mode is packet switching in Step 2520, the communication-mode changeover request is not made. When the absolute value of the counted value is smaller than K or the acceleration is made positive, the time counter is incremented (Step 2524). When the period in the time counter is set equal to the long period (Step 2525), the data generation rate at the long period is calculated. Then, an examination is made as to whether or not the thus calculated rate is less than the lower threshold value (Step 2526). If it is determined that it is less than that value, an examination is made as to whether or not the communication mode is line switching (Step 2520). The process similar to the above one is hereafter performed.

According to the present embodiment, as has been described above, it is possible to determine whether or not the communication-mode changeover is suitably performed by comparing the data generation rate with the present communication mode, thus making it possible to automatically deliver the communication-mode changeover request to the called party.

Having now fully described the invention, it will be apparent to those skilled in the art that many changes and modifications can be made without departing from the spirit or scope of the invention as set forth herein.

What is claimed is:

1. A data communication apparatus for a first data communication station connectable to a second data communication station with a plurality of modes served by a ISDN network, comprising:
    data communication control means for performing data communication in a selected one of said plurality of modes;
    inquiring means for inquiring of the second station subjected to the data communication whether a changeover from said selected one of said modes to another mode can be performed in response to a changeover request of the first station; and
    changeover means for controlling said data communication control means so as to changeover from said selected one of said modes to said another mode without breaking continuity of the data communication in response to an affirmative response from the second data communication station.

2. A data communication apparatus for a first data communication station connectable to a second data communication station with a plurality of modes served by an ISDN network, comprising:
    data communication control means for performing data communication in a selected one of said plurality of modes;
    notifying means for notifying the second data communication station whether a changeover from said selected one of said modes to another mode is enabled or disabled, in response to an inquiry from the second station; and
    changeover means for controlling said data communication control means so as to changeover from said selected one of said modes to said another mode without breaking continuity of the data communication in case that said notifying means notify an affirmative 3. The data communication apparatus as claimed in claim 1, further comprising:
    user interfacing means for accepting an operation request of a changeover of modes from a user, and for informing said inquiring means that the request has occurred.

4. The data communication apparatus as claimed in claim 1, further comprising:
    level-of-data supervision means for supervising a level of data produced between the first data communication station and the second data communication station, and for requesting said inquiring means to inquire according to a variation in the level of said produced data.

5. The data communication apparatus as claimed in claim 1, wherein said data communication control means can carry out the data communication in line and packet switching modes defined as said plurality of modes.

6. The data communication apparatus for a first data communication station connectable to a second data communication station with a plurality of modes served by a ISDN network, comprising:
    data communication control means for performing data communication in a selected one of said plurality of modes;
    inquiring means for inquiring of the second station subjected to the data communication whether a changeover from said selected one of said modes to another mode can be performed in response to a changeover request of the first station; and
    changeover means for controlling said data communication control means so as to changeover from said selected one of said modes to said another mode without breaking continuity of the data communication in response to an affirmative response from the second data communication station;
    wherein said data communication control means comprises a plurality of inputting means provided in association with said plurality of modes, a receiving buffer for storing therein received data from one of said plurality of inputting means, a plurality of outputting means provided in association with said plurality of modes, and a transmitting buffer for storing therein data to be transmitted to one of said plurality of outputting means, said changeover means synchronously selects said one inputting means and said one outputting means.

7. The data communication apparatus as claimed in claim 2, wherein said data communication control means can carry out the data communication in line and packet switching modes defined as said plurality of modes.

8. The data communication apparatus for a first data communication station connectable to a second data communication station with a plurality of modes served by an ISDN network, comprising:
    data communication control means for performing data communication in a selected one of said plurality of modes;
    notifying means for notifying the second data communication station whether a changeover from said selected one of said modes to another mode is enabled or disabled, in response to an inquiry from the second station; and changeover means for controlling said data communication control means so as to changeover from said selected one of said modes to said another mode without breaking continuity of the data communication in case that said notifying means notify an affirmative response;

wherein said data communication control means comprises a plurality of inputting means provided in association with said plurality of modes, a receiving buffer for storing therein received data from one of said plurality of inputting means, a plurality of outputting means provided in association with said plurality of modes, and a transmitting buffer for storing therein data to be transmitted to one of said plurality of outputting means, said changeover means synchronously selects said one inputting means to said one outputting means.

9. The data communication apparatus for a first data communication station connectable to a second data communication station with a plurality of modes served by a ISDN network, comprising:

data communication control means for performing data communication in a selected one of said plurality of modes;

inquiring means for inquiring of the second station subjected to the data communication whether a changeover from said selected one of said modes to another mode can be performed in response to a changeover request of the first station; and changeover means for controlling said data communication control means so as to changeover from said selected one of said modes to said another mode without breaking continuity of the data communication in response to an affirmative response from the second data communication station;

wherein said changeover means serves to stop data from being transmitted to the second station at a time when said changeover request is made, and to resume the transmission of data from a time when said changeover has been completed or when a negative response is received from the second station.

10. The data communication apparatus as claimed in claim 6, further comprising communication data supervising means for being notified by information indicating final data transferred up to a specific point of time between the two stations in said selected one of said modes from said second station, and performing the transfer of undelivered data again between the two stations in another mode after completion of said changeover.

11. The data communication apparatus as claimed in claim 10, further comprising data communication data control table for storing therein packet numbers transferred between the two in case that stations data communication is made in a packet switching mode as said selected one of said modes.

12. The data communication apparatus for a first data communication station connectable to a second data communication station with a plurality of modes served by a ISDN network, comprising:

data communication control means for performing data communication in a selected one of said plurality of modes;

inquiring means for inquiring of the second station subjected to the data communication whether a changeover from said selected one of said modes to another mode can be performed in response to a changeover request of the first station; and changeover means for controlling said data communication control means so as to changeover from said selected one of said modes to said another mode without breaking continuity of the data communication in response to an affirmative response from the second data communication station;

wherein said changeover means is activated in such a manner that when the changeover is made from said selected one of said modes, the data communication between the two stations is continued in said another mode, and when undelivered data to the second station are present at the time of the changeover, said undelivered data are transmitted to the second data communication station in said selected one of said modes in parallel with said another mode.

13. The data communication apparatus for a first data communication station connectable to a second data communication station with a plurality of modes served by a ISDN network, comprising:

data communication control means for performing data communication in a selected one of said plurality of modes;

inquiring means for inquiring of the second station subjected to the data communication whether a changeover from said selected one of said modes to another mode can be performed in response to a changeover request of the first station;

changeover means for controlling said data communication control means so as to changeover from said selected one of said modes to said another mode without breaking continuity of the data communication in response to an affirmative response from the second data communication station; and means for calculating a time at which a charge for use of a public line shall increase from a date of the data communication and an address of the second data communication station, in case that the data communication is performed in a line switching mode as said selected one of said modes, and wherein said changeover means is so activated that the data communication is continuously made in said line switching mode up to said calculated time, without regard to the time of occurrence of said changeover request.

14. A method of data communication linked between first and second data communication stations with an ISDN network in a plurality of kinds of modes, comprising the steps of:

transmitting a changeover inquiry command to the second data communication station from the first data communication station for inquiring of the second data communication station whether a changeover of one of said modes to another of said modes is enabled, when a request of the changeover is made in the first data communication station;

setting a second data communication call with said another of said modes in addition to an existing first data communication call with said one of said modes;

transmitting a permission command to the first data communication station from the second data communication station in response to said changeover inquiry command, in case that said changeover is enabled;

transmitting a reject command to the first data communication station from the second data communication station in response to said changeover inquiry command, in case that said changeover is disabled;
starting the data communication with said second data communication call when the first data communication station accepts said permission command; and
continuing the data communication with said first data communication call when the first data communication station accepts said reject command.

15. A method of data communication linked between first and second data communication stations with an ISDN network in a plurality of kinds of modes, comprising the steps of:
transmitting a changeover inquiry command to the second data communication station from the first data communication station for inquiring of the second data communication station whether a changeover of one of said modes to another of said modes is enabled, when a request of the changeover is made in the first data communication station;
setting a second data communication call with said another of said modes in addition to an existing first data communication call with said one of said modes;
transmitting a permission command to the first data communication station from the second data communication station in response to said changeover inquiry command, in case that said changeover is enabled;
transmitting a reject command to the first data communication station from the second data communication station in response to said changeover inquiry command, in case that said changeover is disabled;
starting the data communication with said second data communication call when the first data communication station accepts said permission command;
continuing the data communication with said first data communication call when the first data communication station accepts said reject command; and
stopping the data communication with said first data communication call when said first data communication station accepts aid permission command, and cancelling the data communication with said second data communication call when said first data communication accepts said reject command.

16. A method of data communication linked between first and second data communication stations with an ISDN network in a plurality of kinds of modes, comprising the steps of:
transmitting a changeover inquiry command to the second data communication station from the first data communication station for inquiring of the second data communication station whether a changeover of one of said modes to another of said modes is enabled, when a request of the changeover is made in the first data communication station;
setting a second data communication call with said another of said modes in addition to an existing first data communication call with said one of said modes;
transmitting a permission command to the first data communication station from the second data communication station in response to said changeover inquiry command, in case that said changeover is enabled;
transmitting a reject command to the first data communication station from the second data communication station in response to said changeover inquiry command, in case that said changeover is disabled;
starting the data communication with said second data communication call when the first data communication station accepts said permission command;
continuing the data communication with said first data communication call when the first data communication station accepts said reject command; and
transmitting said changeover inquiry command to the second data communication station from the first data communication station again when the first data communication station accepts said reject command.

17. A method of data communication as claimed in claim 14, wherein the first and second data communication stations are capable of performing data communication in line and packet switching modes defined as said plurality of kinds of modes.

18. A method of data communication as claimed in claim 16, further comprising the steps of:
cancelling the data communication with said second data communication call when said first data communication station accepts said reject command a predetermined number of times after said second data communication call has been set.

19. A method of data communication linked between first and second data communication stations with an ISDN network in a plurality of kinds of modes, comprising the steps of:
transmitting a changeover inquiry command to the second data communication station from the first data communication station for inquiring of the second data communication station whether a changeover of one of said modes to another of said modes is enabled, when a request of the changeover is made in the first data communication station;
setting a second data communication call with said another of said modes in addition to an existing first data communication call with said one of said modes;
transmitting a permission command to the first data communication station from the second data communication station in response to said changeover inquiry command, in case that said changeover is enabled;
transmitting a reject command to the first data communication station from the second data communication station in response to said changeover inquiry command, in case that said changeover is disabled;
starting the data communication with said second data communication call when the first data communication station accepts said permission command; and
continuing the data communication with said first data communication call when the first data communication station accepts said reject command;
wherein said changeover inquiry command, said accept command and said reject command are incorporated into user to user information elements in call control primitives.

* * * * *